United States Patent
Bishop et al.

(10) Patent No.: US 8,081,646 B1
(45) Date of Patent: Dec. 20, 2011

(54) OLD VIRTUAL QUEUES TECHNIQUE FOR ROUTING DATA PACKETS IN A PACKET SWITCH

(75) Inventors: Robert Henry Bishop, Suwanee, GA (US); Angus David Starr MacAdam, Suwanee, GA (US)

(73) Assignee: Integrated Device Technology, inc., San Jose, CA (US)

( * ) Notice: Subject to any disclaimer, the term of this patent is extended or adjusted under 35 U.S.C. 154(b) by 205 days.

(21) Appl. No.: 12/328,953

(22) Filed: Dec. 5, 2008

Related U.S. Application Data

(60) Provisional application No. 61/013,244, filed on Dec. 12, 2007.

(51) Int. Cl.
*H04L 12/28* (2006.01)
(52) U.S. Cl. .................... 370/413; 370/422
(58) Field of Classification Search .......... None
See application file for complete search history.

(56) References Cited

U.S. PATENT DOCUMENTS

| | | | |
|---|---|---|---|
| 4,314,367 A | | 2/1982 | Bakka et al. |
| 5,260,935 A | * | 11/1993 | Turner ............... 370/394 |
| 5,511,070 A | | 4/1996 | Lyles |
| 5,537,400 A | | 7/1996 | Diaz et al. |
| 6,014,690 A | | 1/2000 | VanDoren et al. |
| 6,124,878 A | * | 9/2000 | Adams et al. ............ 725/118 |
| 6,222,848 B1 | * | 4/2001 | Hayward et al. ........... 370/412 |
| 6,249,520 B1 | | 6/2001 | Steeley et al. |
| 6,272,127 B1 | | 8/2001 | Golden et al. |
| 6,731,644 B1 | * | 5/2004 | Epps et al. ................ 370/412 |
| 7,010,607 B1 | | 3/2006 | Bunton |
| 7,020,133 B2 | | 3/2006 | Zhao et al. |
| 7,145,904 B2 | | 12/2006 | Zhao et al. |
| 7,154,905 B2 | | 12/2006 | Shin et al. |
| 7,155,553 B2 | | 12/2006 | Lueck et al. |
| 7,210,056 B2 | | 4/2007 | Sandven et al. |
| 7,274,701 B2 | | 9/2007 | Boduch et al. |
| 7,304,987 B1 | | 12/2007 | James et al. |
| 7,305,492 B2 | | 12/2007 | Bryers et al. |
| 7,406,086 B2 | | 7/2008 | Deneroff et al. |
| 7,436,845 B1 | | 10/2008 | Rygh et al. |
| 7,529,217 B2 | | 5/2009 | Pister et al. |

(Continued)

OTHER PUBLICATIONS

RapidIO Interconnect Specification Part 1: Input/output Logistical Specification, RapidIO Trade Association, Revision 2.0, Mar. 2008, pp. 1-64.

(Continued)

*Primary Examiner* — Marsha D Banks Harold
*Assistant Examiner* — Hooman Houshmand
(74) *Attorney, Agent, or Firm* — Kenneth Glass; Stanley J. Pawlik; Glass & Associates

(57) ABSTRACT

A packet switch includes virtual output queues for mapping data units of data packets from input ports to output ports of the packet switch. The packet switch selects virtual output queues based on old age indicators of the virtual output queues and routes data units mapped at heads of the selected virtual output queues to output ports of the packet switch. Further, the packet switch may identify a data unit of a multicast data packet mapped at the head of more than one virtual output queue and contemporaneously route the data unit to more than one output port. Additionally, the packet switch may update an old age indicator to indicate a virtual output queue is old if the virtual output queue maps an unserviceable data unit of a multicast data packet and the same data unit is mapped at the head of a selected virtual output queue.

12 Claims, 15 Drawing Sheets

U.S. PATENT DOCUMENTS

| | | | |
|---|---|---|---|
| 7,602,811 | B2 | 10/2009 | Porter et al. |
| 7,606,151 | B2 | 10/2009 | Chilukoor |
| 7,724,734 | B1* | 5/2010 | Grosser et al. .................. 370/389 |
| 7,742,486 | B2 | 6/2010 | Nielsen et al. |
| 2001/0033552 | A1 | 10/2001 | Barrack et al. |
| 2001/0050916 | A1* | 12/2001 | Krishna et al. ................. 370/419 |
| 2002/0039364 | A1* | 4/2002 | Kamiya et al. ................. 370/389 |
| 2002/0069271 | A1* | 6/2002 | Tindal et al. ................... 709/221 |
| 2002/0075883 | A1* | 6/2002 | Dell et al. ...................... 370/413 |
| 2002/0176431 | A1* | 11/2002 | Golla et al. .................... 370/412 |
| 2002/0199205 | A1 | 12/2002 | Sonawane et al. |
| 2003/0107996 | A1 | 6/2003 | Black et al. |
| 2003/0123468 | A1* | 7/2003 | Nong ............................. 370/412 |
| 2004/0017804 | A1 | 1/2004 | Vishnu |
| 2004/0103218 | A1 | 5/2004 | Blumrich et al. |
| 2004/0151209 | A1 | 8/2004 | Cummings et al. |
| 2005/0207436 | A1 | 9/2005 | Varma |
| 2006/0028987 | A1 | 2/2006 | Alexander Gildfind et al. |
| 2006/0039370 | A1 | 2/2006 | Rosen et al. |
| 2006/0120498 | A1 | 6/2006 | Wong et al. |
| 2006/0221948 | A1 | 10/2006 | Benner et al. |
| 2007/0067551 | A1 | 3/2007 | Ikeda et al. |
| 2007/0253439 | A1 | 11/2007 | Iny |
| 2008/0165768 | A1 | 7/2008 | Shah |
| 2009/0262732 | A1 | 10/2009 | Wood |

OTHER PUBLICATIONS

Xin Li, Latfi Mhamdi, Jung Liu, Konghong Pun, and Mournir Hamdi, "1.3 Buffered Crossbar Switches," High-performance Packet Switching Architectures, pp. 12-13 and 36-37, Springer London, Aug. 30, 2006.

Zhen Guo, Roberto Rojas-Cessa, and Nirwan Ansari "Packet Switch with Internally Buffered Crossbars," High-performance Packet Switching Architectures, pp. 121-146, Springer London, Aug. 30, 2006.

Kenji Yoshigoe and Ken Christensen "The Combined Input and Crosspoint Queued Switch," High-performance Packet Switching Architectures, pp. 169-195, Springer London, Aug. 30, 2006.

Xiao Zhang and Laxmi N. Bhuyan, "Deficit Round-Robin Scheduling for Input-Queued Switches" IEEE Journal on Selected Areas in Communications, pp. 584-594, vol. 21, No. 4, May 2003.

M Shreedhar and George Varghese, "Efficient Fair Queuing Using Deficit Round Robin" IEEE/ACM Transactions on Networking, pp. 375-385, vol. 4, No. 3, Jun. 1996.

Kang Xi, Shin'ichi Arakawa, Masayuki Murata, Ning Ge and Chongxi Feng, "Packet-Mode Scheduling with Proportional Fairness for Input-Queued Switches" IEICE Trans. Commun., pp. 4274-4284, vol. E88—B, No. 11 Nov. 2005.

* cited by examiner

OLD VIRTUAL QUEUES TECHNIQUE FOR ROUTING DATA PACKETS IN A PACKET SWITCH

CROSS-REFERENCE TO RELATED APPLICATION

The present application claims benefit of U.S. Provisional Application Ser. No. 61/013,244, filed Dec. 12, 2007, entitled "Next-Generation SRIO Switching Devices and Methods," which is incorporated herein by reference in its entirety.

BACKGROUND

In some packet-based communications systems, a packet switch stores fixed-sized portions of data packets, which are often referred to as cells, at input ports of the packet switch. Further, the packet switch selects cells at the input ports and individually routes the selected cells to output ports of the packet switch. At the output ports, the packet switch identifies cells belonging to the same data packet, assembles the identified cells to reconstruct the data packet, and outputs the reconstructed data packet from the packet switch. In this type of packet switch, the order in which cells are routed from the input ports to the output ports of the packet switch impacts throughput of the packet switch.

One technique for selecting cells to route from input ports to output ports of a packet switch employs an oldest cells first (OCF) algorithm. In this technique, each input port includes virtual output queues, each of which represents an output port of the packet switch. The input port receives cells of a data packet, identifies an output port of the packet switch based on a header of the data packet, and maps the cells to the virtual output queue representing the identified output port. Further, the input port maintains a time stamp for each cell indicating how long the cell as been waiting in the virtual output queue. In turn, an arbiter in the packet switch selects cells that may be simultaneously routed from the input ports to the output ports of the packet switch, based on the time stamps of the cells and the ability of each output port to accept a cell. In this selection process, the arbiter gives preference to the oldest cells in the input ports. Although this technique has been successfully employed to route data packets through a packet switch, the size and complexity of logic for employing this technique in a packet switch grows exponentially as the number of input ports and output ports increases. Moreover, the speed of the logic for employing this technique decreases as the size and complexity of the logic increases, which reduces performance and throughput of the packet switch.

Throughput and performance of a packet switch employing this technique may also be adversely affected by multicast data packets. In particular, the packet switch may individually route a cell of a multicast data packet to each destination output port identified by the multicast data packet. Accordingly, the number of times the packet switch individually routes a cell of a multicast data packet from an input port of the packet switch to a destination output port of packet switch may be equal to the number of destination output ports identified by the multicast data packet. As a result, throughput of the packet switch is reduced when the packet switch routes the multicast data packet through the packet switch. Further, because the packet switch may route cells of other data packets from the input port to output ports of the packet switch between individually routing a cell of the multicast data packet to destination ports, the multicast data packet may experience increased latency in the packet switch. As a result, the latency of the multicast data packet is substantially higher than latencies of other data packets in the packet switch, which adversely affects performance of the packet switch.

In light of the above, a need exists for an improved system and method of routing data packets through a packet switch. A further need exists for increasing performance and throughput of a packet switch capable of routing multicast data packets.

SUMMARY

In various embodiments, a communication system includes a packet switch that routes data packets between source devices and destination devices in the communication system by using virtual output queues. Each input port of the packet switch includes virtual output queues corresponding to the output ports. Further, the input port maps a data packet received by the input port from a source device to an output port of the packet switch by updating the virtual output queue of the input port corresponding to the output port. In this way, the input port associates each data unit of the data packet with the virtual output queue and maps each data unit of the data packet to the output port. If the age of the oldest data packet mapped by a virtual output queue has reached an old age threshold, the virtual output queue is considered to be old and remains old until the virtual output queue becomes empty. The packet switch selects virtual output queues by giving preference to old virtual output queues and routes data units mapped by the selected virtual output queues to the output ports. In turn, the output ports output the data units of the data packets to the destination devices. By giving preference to old virtual output queues, the packet switch promotes fairness in routing data packets through the packet switch. Moreover, the packet switch need not maintain a timestamp for each data packet mapped by the virtual output queues, which reduces the size of the virtual output queues. Further, logic circuitry for selecting virtual output queues in the packet switch is simplified, which reduces the size of the logic circuitry and increases the speed of the logic circuitry.

In a further embodiment, the packet switch identifies a multicast data packet mapped at a head of a selected virtual output queue of an input port. Further, the packet switch identifies one or more virtual output queues of the input port that maps the multicast data packet at the head of that identified virtual output queue. Additionally, the packet switch determines whether the multicast data packet mapped by an identified virtual output queue in the input port may be contemporaneously routed through the packet switch along with the multicast data packet mapped by the selected virtual output queue in the input port. If the packet switch determines the multicast data packet mapped by the identified virtual output queue may be contemporaneously routed through the packet switch along with the multicast data packet mapped by the selected virtual output queue in the input port, the packet switch selects the identified virtual output queue in addition to the virtual output queue in the input port already selected by the packet switch. Further, the packet switch contemporaneously routes the multicast data packet mapped at the head of each selected virtual output queue in the input port to the output ports corresponding to selected virtual output queues in the packet switch, which increases throughput of the packet switch. Additionally, performance of the switch increases because the overall latency of the multicast data packet is reduced in the packet switch.

In another further embodiment, the packet switch identifies a multicast data packet mapped at a head of a selected virtual output queue of an input port. Further, the packet switch identifies another virtual output queue of the input port mapping the multicast data packet, determines the multicast data packet is not presently serviceable from the identified virtual output queue, and modifies an old age indicator of the identified virtual output queue to indicate the identified virtual output queue is old. Because the packet switch selects virtual output queues by giving preference to old virtual output queues, the identified virtual output queue has preference when the packet switch selects the subsequent virtual output queues for routing data units through the packet switch. As a result, the latency of the multicast data packet is reduced in the packet switch, which improves performance of the packet switch.

A packet switch, in accordance with one embodiment, includes output ports, input ports, an arbiter coupled to the input ports, and a switch fabric coupled to the input ports and the output ports. Each of the input ports includes virtual output queues corresponding to the output ports for mapping data units of data packets received by the input port to the output ports. Further, each of the input ports is configured to maintain an old age indicator for each of the virtual output queues in the input port indicating whether the virtual output queue is old. The arbiter is configured to select virtual output queues based on the old age indicators of the virtual output queues. The switch fabric is configured to route data units mapped by the selected virtual output queues to the output ports corresponding to the selected virtual output queues. Each of the output ports is configured to output data units of data packets received by the output port.

A packet switch, in accordance with one embodiment, includes output ports, input ports, an arbiter coupled to the input ports, and a switch fabric coupled to the input ports and the output ports. Each of the input ports includes an input buffer, virtual output queues corresponding to the output ports, and a packet engine coupled to the input buffer and the virtual output queues. The input buffer of each input port is configured to store data units of data packets received by the input port. The virtual output queues of each input port map data units of data packets received by the input port to the output ports. The packet engine of each input is configured to maintain an old age indicator for each virtual output queue of the input port indicating whether the virtual output queue is old. The arbiter is configured to select virtual output queues based on the old age indicators of the virtual output queues. The switch fabric is configured to contemporaneously route the data units mapped by the selected virtual output queues to the output ports corresponding to the selected virtual output queues.

A method, in accordance with one embodiment, includes receiving data units of data packets at input ports of a packet switch and mapping each of the data units received at an input port of the packet switch to an output port of the packet switch by using a virtual output queue of the input port. The method also includes maintaining an old age indicator for each virtual output queue indicating whether the virtual output queue is old. Further, the method includes selecting virtual output queues based on the old age indicators and routing the data units mapped by the selected virtual output queues to the output ports corresponding to the selected virtual output queues.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

Figure 1:
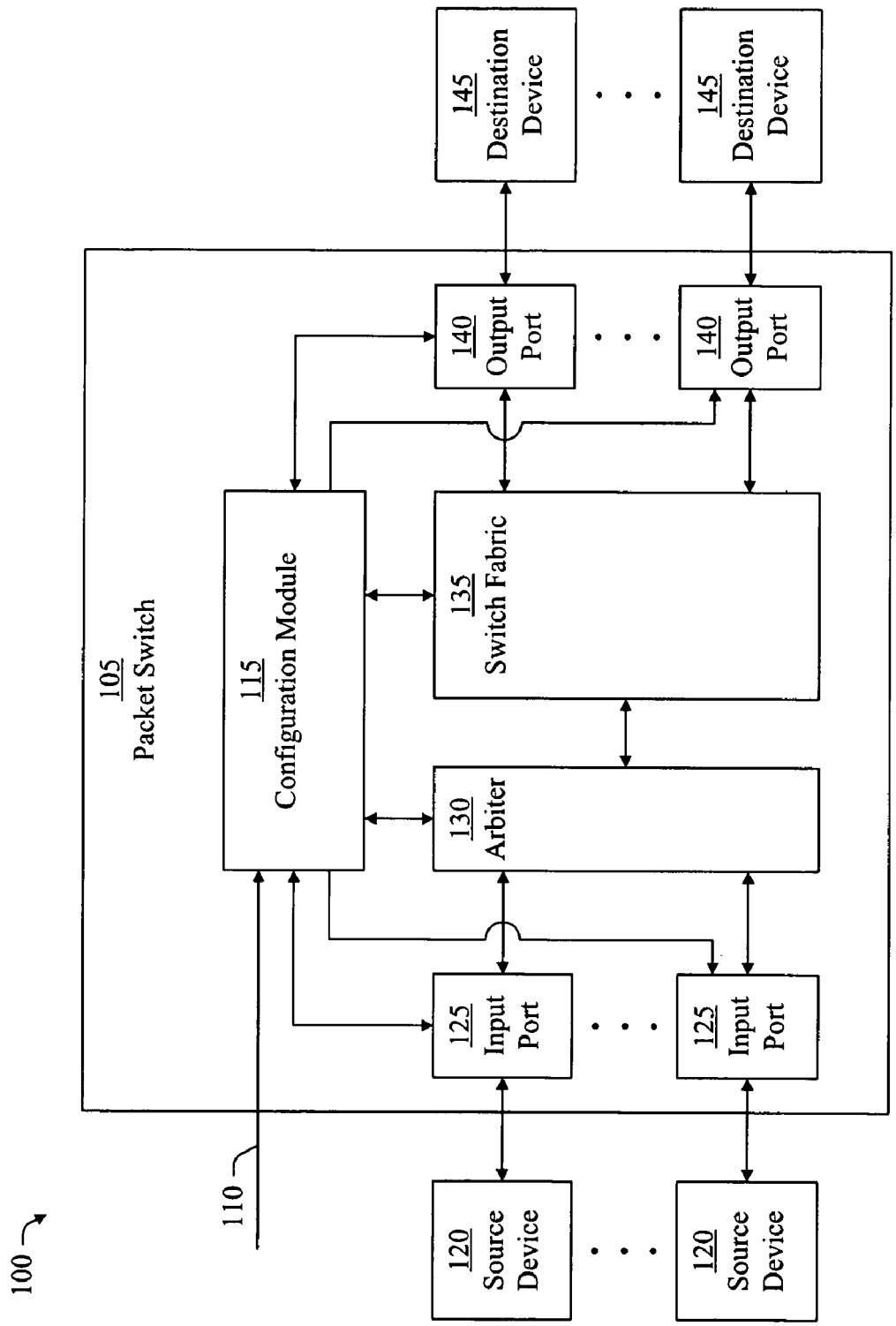
FIG. 1 is a block diagram of a communication system, in accordance with an embodiment of the present invention.

In various embodiments, a communication system includes a packet switch that uses virtual output queues to route data packets between source devices and destination devices in the communication system. Input ports of the packet switch each have virtual outputs queues for mapping data units of data packets received by the input port to output ports of the packet switch. Additionally, the packet switch maintains an old age indicator for each virtual output queue indicating whether the virtual output queue is old or young. The packet switch initializes the old age indicator of a virtual output queue to indicate the virtual output queue is young. Further, the packet switch updates the old age indicator of the virtual output queue to indicate the virtual output queue is old when the age of the oldest data unit mapped by the virtual output queue has reached an old age threshold. Additionally, the packet switch updates the old age indicator of the virtual output queue to indicate the virtual output queue is young when the virtual output queue becomes empty. The packet switch selects virtual output queues based on the old age indicators of the virtual output queues and routes the data units of the data packets mapped at heads of the selected virtual output queues to the output ports. In turn, the output ports output the data units of the data packets to the destination devices. In this way, the packet switch reduces latencies of data packets routed through the packet switch, which improves performance of the packet switch. Further, throughput is increased in the packet switch. Moreover, the packet switch need not maintain a timestamp for each data packet mapped by the virtual output queues, which reduces the size of the virtual output queues. Further, logic circuitry for selecting virtual output queues in the packet switch is simplified, which reduces the size of the logic circuitry and increases the speed of the logic circuitry.

In further embodiments, the packet switch may select more than one virtual output queue of an input port, each of which maps a multicast data packet at its head, and contemporaneously route the multicast data packet from each selected virtual output queue through the packet switch. Additionally, the packet switch may select a virtual output queue of an input port mapping the multicast data packet at the head of the selected virtual output queue and identify another virtual output queue of the input port that maps the multicast data packet but the multicast data packet is not presently serviceable from the identified virtual output queue. Further, the packet switch updates the old age indicator of the identified virtual output queue to indicate the identified virtual output queue is old. Because the packet switch selects virtual output queues by giving preference to old virtual output queues, the identified virtual output queue has preference when the packet switch selects the subsequent virtual output queues for routing data units through the packet switch. In this way, latency of the multicast data packet is reduced in the packet switch, which improves performance of the packet switch. Further, throughput is increased in the packet switch.

FIG. 1 illustrates a communication system 100, in accordance with an embodiment of the present invention. The communication system 100 includes a packet switch 105, source devices 120, and destination devices 145. The source devices 120 send data packets to the packet switch 105 and the packet switch 105 routes the data packet to destination devices 145 based on the data packets. In various embodiments, the packet switch 105 routes a data packet received from a source device 120 to a destination device 145 based on a packet header in the data packet or a data payload in the data packet, or both.

In some embodiments, the packet switch 105 is compliant with a serial RapidIO (sRIO) standard, such as the sRIO 1.3 standard or the sRIO 2.0 standard. In these embodiments, the packet switch 105 receives data packets compliant with an sRIO standard from the source devices 120 and sends data packets compliant with an sRIO standard to the destination devices 145. In some embodiments, the packet switch 105, the source devices 120, and the destination devices 145 are compliant with the same sRIO standard. In other embodiments, the packet switch 105 is compliant with more than one sRIO standard, and each of the source devices 120 and the destination devices 145 is compliant with at least one of these sRIO standards. In some embodiments, the packet switch 105 is implemented in a single semiconductor die. In other embodiments, the packet switch 105 is implemented in multiple semiconductor die and contained in a chip package. For example, the packet switch 105 may be contained in a multi-chip package.

In one embodiment, the packet switch 105 includes a configuration module 115, input ports 125, an arbiter 130, a switch fabric 135, and output ports 140. The input ports 125 are coupled (e.g., connected) to configuration module 115 and the arbiter 130. The switch fabric 135 is coupled (e.g., connected) to the arbiter 130, the configuration module 115, and the output ports 140. Additionally, the switch fabric 135 is coupled to the input ports 125. For example, the switch fabric 135 may be connected to the input ports 125 or coupled to the input ports 125 through the arbiter 130. In various embodiments, the arbiter 130 is distributed in the packet switch 105, as is described more fully herein. For example, the input ports 125, the switch fabric 135, and the output ports 140 may each contain a portion of the arbiter 130.

In operation, the input ports 125 receive data packets from source devices 120 corresponding to the input ports 125. Each input port 125 receiving a data packet stores data (e.g., data units) of the data packet. The arbiter 130 selects data packets stored in the input ports 125 such that the selected data packets may be contemporaneously routed from the input ports 125 to the output ports 140, as is described more fully herein. The switch fabric 135 contemporaneously routes the selected data packets from the input ports 125 to the output ports 140, based on the contents of the data packets. In turn, each output port 140 receiving a data packet from an input port 125 through the switch fabric 135 stores the data packet and outputs the data packet from the packet switch 105. For example, the output port 140 may store a data packet received from the switch fabric 135 and output the data packet stored in the output port 140 to the destination device 145 corresponding to the output port 140.

The configuration module 115 configures (e.g., programs) operation of the packet switch 105, for example based on information received from a user through the communication channel 110. In various embodiments, the configuration module 115 configures each input port 125 to identify output ports 140 based on data packets received by the input port 125. In some embodiments, the configuration module 115 maintains a route table for each input port 125 for mapping a destination address of a data packet received by the input port 125 to a port identifier identifying an output port 140 in the packet switch 105. In these embodiments, the input port 125 identifies a port identifier of a data packet from the route table based on the destination address of the data packet. Further, the input port 125 provides the port identifier along with data of the data packet to the switch fabric 135 and the switch fabric 135 routes the data of the data packet to the output port 140 identified by the port identifier (e.g., a destination output port). In various embodiments, the data of the data packet may be the entire data packet or a portion of the data packet. For example, the data of the data packet may be a data byte or a data word in a packet header or a data payload of the data packet.

Figure 2:
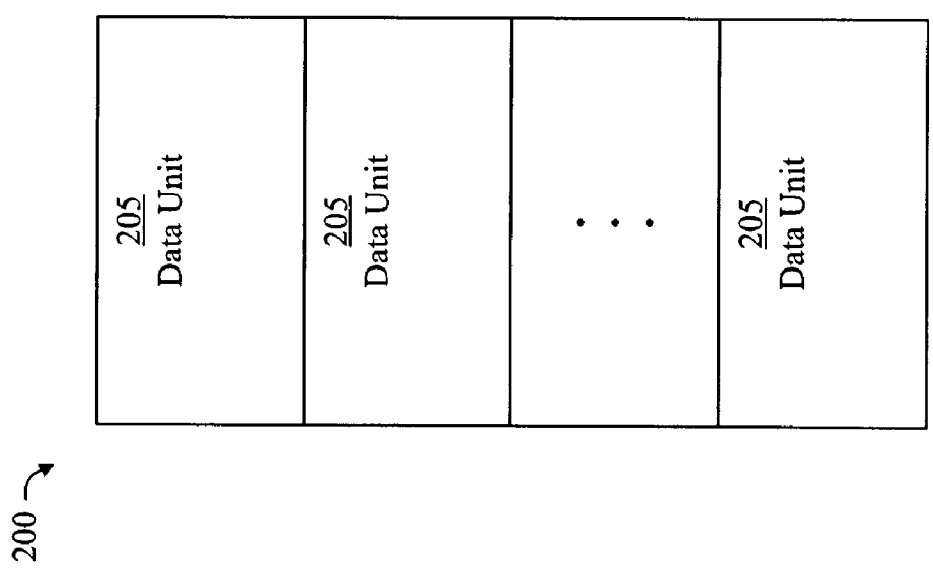
FIG. 2 is a block diagram of a data packet, in accordance with an embodiment of the present invention.

FIG. 2 illustrates a data packet 200, in accordance with an embodiment of the present invention. The data packet 200 includes data units 205, each of which contains data of the data packet 200 (e.g., a portion of the data packet 200). The data unit 205 may be any unit of data, such as a data bit, a data byte, a data word, or the like. Moreover, the data packet 200 has a size which depends upon the number of data units 205 in the data packet 200 and the size of each data unit 205 in the data packet 200. In some embodiments, the data packet 200 has a fixed size (e.g., a predetermined size). In other embodiments, the data packet 200 has a variable size. For example, the data packet 200 may include a single data unit 205 or any number of data units 205.

In various embodiments, the packet switch 105 receives a data packet 200 by receiving a data unit 205 (e.g., a first data unit 205) of the data packet 200. Further, the packet switch 105 routes the data packet 200 through the packet switch 105 by individually routing each data unit 205 of the data packet 200 through the packet switch 105. In this way, the packet switch 105 may receive a data unit 205 of a data packet 200 and route the data unit 205 through the packet switch 105 before receiving each of the data units 205 of the data packet 200. In further embodiments, the packet switch 105 routes a data packet 200 containing data units 205 through the packet switch 105 as an atomic unit. In these embodiments, an input port 125 selected by the arbiter 130 provides the data units 205 of a data packet 200 to the switch fabric 135 in sequence without providing a data unit 205 of another data packet 200 to the switch fabric 135 between any two data units 205 in the sequence.

Figure 3:
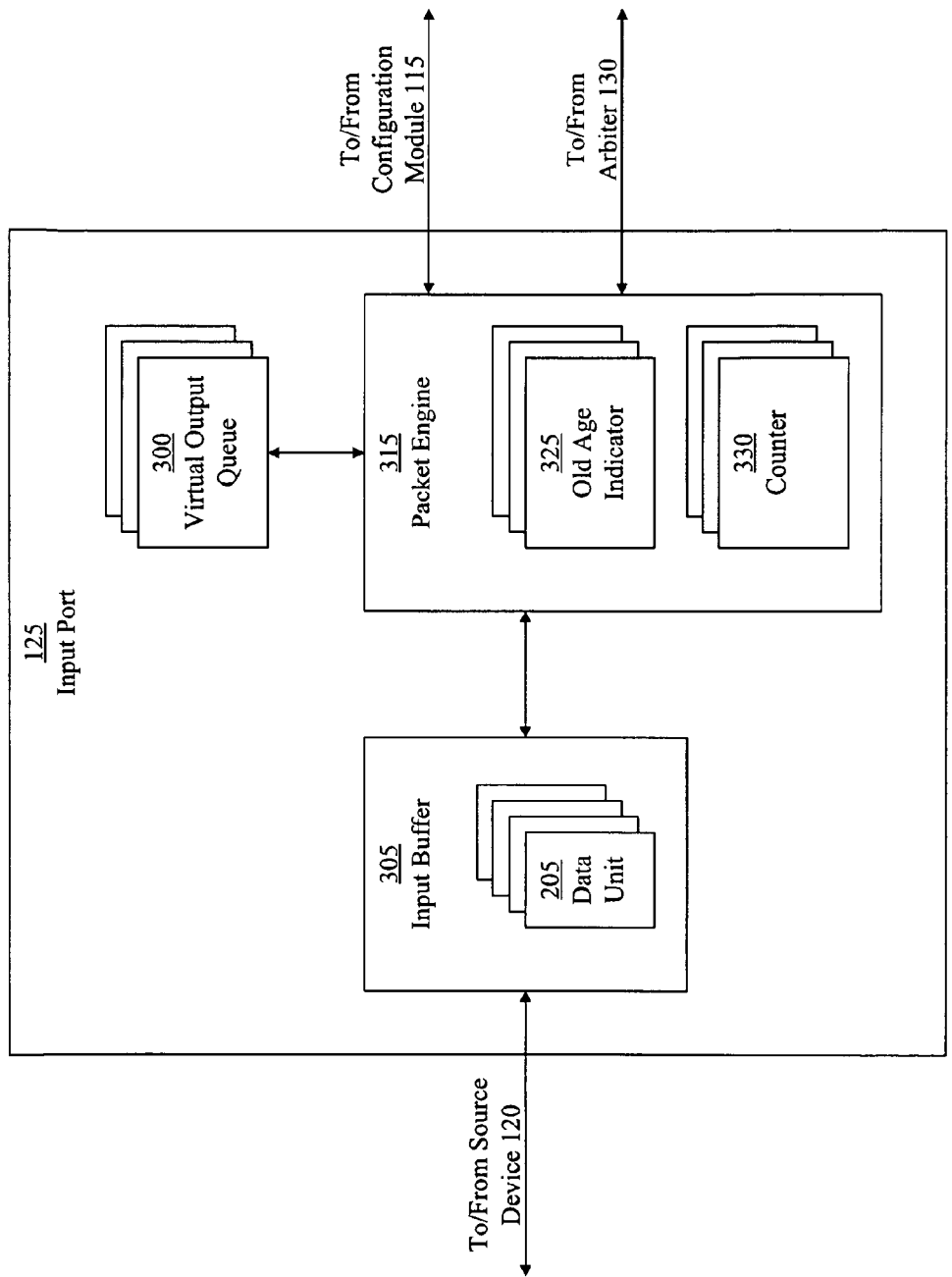
FIG. 3 is a block diagram of an input port in a packet switch, in accordance with an embodiment of the present invention.

FIG. 3 illustrates the input port 125, in accordance with an embodiment of the present invention. The input port 125 includes virtual output queues 300, an input buffer 305, and a packet engine 315. The packet engine 315 is coupled (e.g., connected) to the virtual output queues 300 and the input buffer 305. The input port 125 receives data packets 200, or data units 205 of data packets 200, from the source device 120 corresponding to the input port 125 and writes data units 205 of the data packets 200 into the input buffer 305. In turn, the input buffer 305 stores the data units 205. The packet engine 315 associates data units 205 stored in the input buffer 305 to output ports 140 of the packet switch 105 by updating the virtual output queues 300 to map the data units 205 to the output ports 140, as is described more fully herein.

Additionally, the packet engine 315 maintains an old age indicator 325 and a counter 330 for each virtual output queue 300 in the input port 125. The counter 330 of a virtual output queue 300 in the input port 125 indicates the age of the oldest data unit 205 mapped by the virtual output queue 300. The old age indicator 325 of a virtual output queue 300 indicates whether the virtual output queue 300 is old. The virtual output queue 300 is consider to be old when the age of the oldest data unit 205 mapped by the virtual output queue 300 has reached an old age threshold. The arbiter 130 selects virtual output queues 300 based on the old age indicators 325, and the switch fabric 135 routes a data unit 205 from each selected virtual output queue 300 to an output port 140 to which the data unit 205 is mapped. In various embodiments, the switch fabric 135 contemporaneously (e.g., substantially simultaneously) routes the oldest data unit 205 in each selected virtual output queue 300 to the output port 140 corresponding to the virtual output queue 300, as is described more fully herein. Because each input port 125 maintains an old age indicator 325 for each virtual output queue 300 in the input port 125 and the arbiter 130 selects virtual output queues 300 based on the old age indicators 325, the packet switch 105 need not maintain a timestamp for each data packet 200 mapped by the virtual output queues 300 to select virtual output queues 300. As a result, the size of logic circuitry in the virtual output queues 300 is reduced, which reduces the size of the virtual output queues 300. Further, logic circuitry in the arbiter 130 for selecting virtual output queues 300 is simplified, which reduces the size of the arbiter 130 and increases the speed of the logic circuitry and the arbiter 130.

Figure 4:
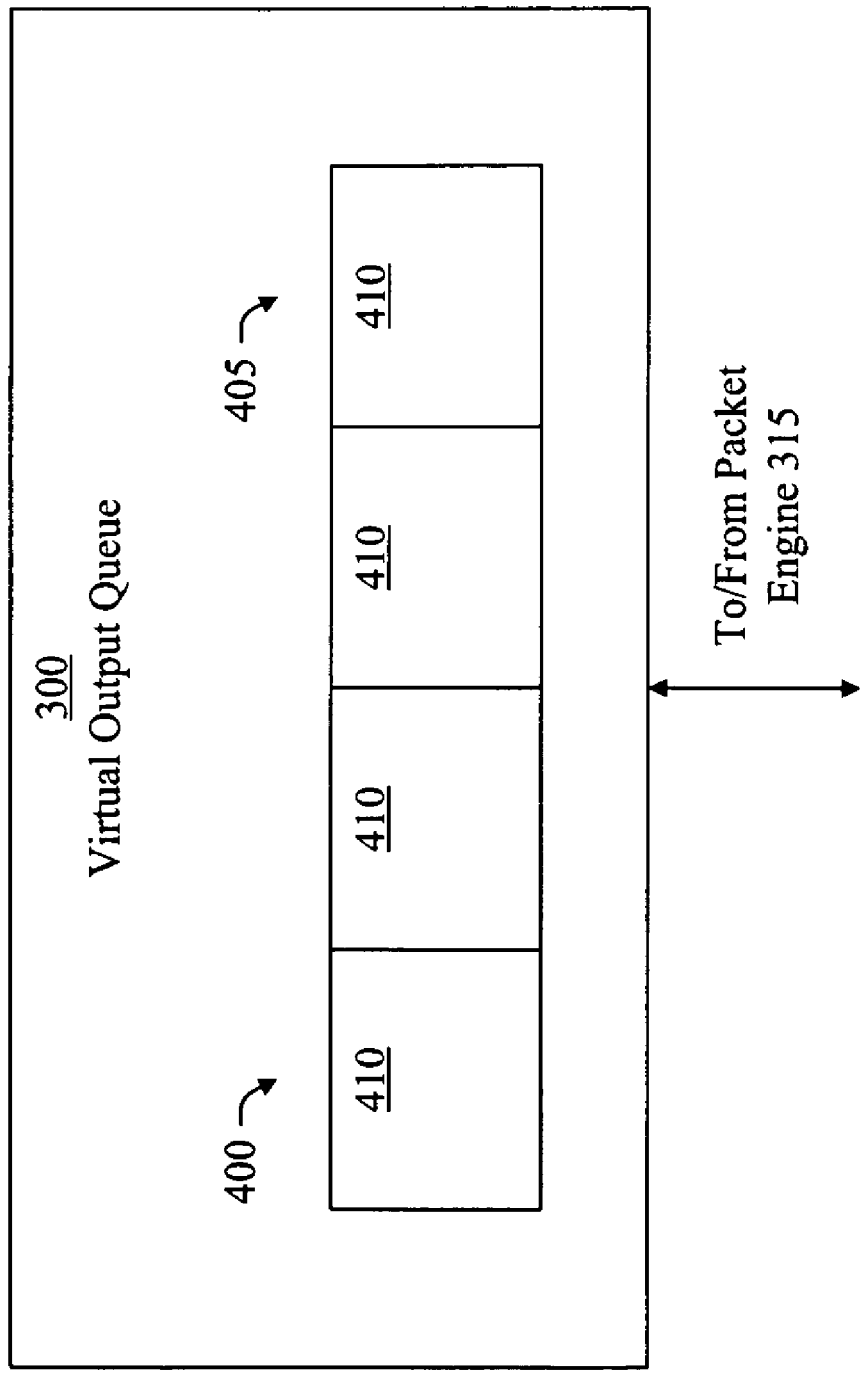
FIG. 4 is a block diagram of a virtual output queue, in accordance with an embodiment of the present invention.

FIG. 4 illustrates the virtual output queue 300, in accordance with an embodiment of the present invention. The virtual output queue 300 includes map units 410 for mapping data packets 200 received by the input port 125 including the virtual output queue 300. In this way, the virtual output queue 300 maps the data packets 200 as well as data units 205 of the data packets 200 stored in the input buffer 305 of the input port 125 including the virtual output queue 300 to the output port 140 corresponding to the virtual output queue 300. Further, the virtual output queue 300 includes a tail pointer identifying a tail 400 of the virtual output queue 300 and a head pointer identifying a head 405 of the virtual output queue 300. The head 405 of the virtual output queue 300 maps the oldest data packet 200, if any, mapped by the virtual output queue 300. In this way, the head 405 of the virtual output queue 300 maps the oldest data unit 205, if any, mapped by the virtual output queue 300.

The tail 400 of the virtual output queue 300 maps the youngest data packet 200, if any, mapped by the virtual output queue 300. In this way, the tail 400 of the virtual output queue 300 maps the youngest data unit 205, if any, mapped by the virtual output queue 300. In some embodiments, the data packet 200 mapped at the tail 400 of the virtual output queue 300 may be the same data packet 200 mapped at the head 405 of the virtual output queue 300. For example, the virtual output queue 300 may be presently mapping only one data packet 200, which is both the youngest data packet 200 and oldest data packet 200 mapped by the virtual output queue 300.

In various embodiments, each of the virtual output queues 300 corresponds to an output port 140 in the packet switch 105 and maps data units 205 stored in the input buffer 305 to the corresponding output port 140. In operation, the packet engine 315 identifies an output port 140 (e.g., a destination output port) for a data unit 205 of a data packet 200 received by the input port 125. For example, the packet engine 315 may identify the output port 140 of the data unit 205 from a route table, based on a destination identifier in the data packet 200. The packet engine 315 selects the virtual output queue 300 corresponding to the identified output port 140 and updates the selected virtual output queue 300 to map the data unit 205 of the data packet 200 stored in the input buffer 305 to the identified output port 140. In this way, the packet engine 315 associates each data unit 205 of the data packet 200 with the identified output port 140 and the selected virtual output queue 300 maps each data unit 205 of the data packet 200 to the identified output port 140.

The arbiter 130 selects virtual output queues 300 in an arbitration cycle based on the old age indicators 325 of the virtual output queues 300 and the capacity of the output ports 140 to accept data units 205. In this selection process, the arbiter 130 gives preference to old virtual output queues 300 (i.e., virtual output queues 300 having old age indicators 325 indicating the virtual output queues 300 are old) in a first phase of the arbitration cycle. For example, the arbiter 130 may use a scheduling algorithm, such as a round robin algorithm, to select old virtual output queues 300 in the first phase of the arbitration cycle. In a second phase of the arbitration cycle, the arbiter 130 may select one or more young virtual output queues 300 (i.e., virtual output queues 300 having old age indicators 325 indicating the virtual output queues 300 are young). For example, the arbiter 130 may use a scheduling algorithm, such as a round robin algorithm, to select young virtual output queues 300 in the second phase of the arbitration cycle. In this way, the arbiter 130 gives preference to selecting old virtual output queues 300 in the first phase of the arbitration cycle over selecting young virtual output queues 300 in the second phase of the arbitration cycle.

In some embodiments, the arbiter 130 coordinates the scheduling algorithm in the first phase of the arbitration cycle with the scheduling algorithm in the second phase of the arbitration cycle to promote fairness in selecting virtual output queues 300. For example, the arbiter 130 may use a round robin algorithm in the first phase of the arbitration cycle to select old virtual output queues 300 from a circular sequence of the virtual output queues 300. Additionally, the arbiter 130 may use another round robin algorithm in the second phase of the arbitration cycle to select young virtual output queues 300 from the circular sequence of virtual output queues 300. Further, the arbiter 130 maintains a pointer to the last virtual output queue 300 selected in the circular sequence of virtual output queues 300 in an arbitration cycle, which may occur in either the first phase or the second phase of the arbitration cycle. By sharing the pointer to the last virtual output queue 300 selected in the circular sequence of virtual output queues 300, the arbiter 130 promotes fairness in selecting virtual output queues 300 in the arbitration cycle.

In various embodiments, the arbiter 130 selects virtual output queues 300 in an arbitration cycle so that the switch fabric 135 routes a data unit 205 mapped at the head 405 of each selected virtual output queue 300 to the output port 140 corresponding to the virtual output queue 300 in the arbitration cycle. In this way, the switch fabric 135 contemporaneously routes the data units 205 mapped at the heads 405 of the selected virtual output queues 300 to the output ports 140 corresponding to the selected virtual output queues 300.

In one embodiment, the arbitration cycle includes a first phase and a second phase. In the first phase of the arbitration cycle, the arbiter 130 may select one or more old virtual output queues 300, each of which maps a data packet 200 at the head 405 of the old virtual output queue 300. Moreover, the arbiter 130 uses a selection algorithm to select a maximum number of old virtual output queues 300 in the first phase of the arbitration cycle.

In the second phase of the arbitration cycle, the arbiter 130 may select one or more young virtual output queues 300, each of which maps a data packet 200 at the head 405 of the young virtual output queue 300. Moreover, the arbiter 130 uses a selection algorithm to select a maximum number of young virtual output queues 300 in the second phase of the arbitration cycle. In this embodiment, the arbiter 130 does not select a young virtual output queue 300 in the second phase of the arbitration cycle that corresponds to an output port 140 corresponding to an old virtual output queue 300 selected by the arbiter 130 in the first phase of the arbitration cycle. Additionally, the arbiter 130 does not select more than one young virtual output queue 300 that corresponds to the same output port 140. Moreover, the arbiter 130 does not select a young virtual output queue 300 that corresponds to an output port 140 not having capacity to accept a data unit 205.

In various embodiments, the packet engine 315 unmaps a data packet 200 mapped at the head 405 of a virtual output queue 300 when the arbiter 130 has selected the virtual output queue 300 and the input port 125 has provided each the data unit 205 of the data packet 200 to the switch fabric 135 for routing to the output port 140 corresponding to the virtual output queue 300. As a result, the virtual output queue 300 no longer maps the data packet 200. Further, the packet engine 315 resets the old age indicator 325 of the virtual output queue 300 to indicate the virtual output queue 300 is young when the virtual output queue 300 no longer maps any data packet 200 (e.g., the virtual output queue 300 is empty). In this way, the virtual output queue 300 remains old until each data unit 205 of each data packet 200 mapped by the virtual output queue 300 is provided to the switch fabric 135 and the packet engine 315 resets the old age indicator 325 of the virtual output queue 300.

In various embodiments, each data unit 205 has a fixed (e.g., predetermined) size. For example, each data unit 205 may be a data bit, a data byte, a data word, or an entire data packet. In some embodiments, the input buffer 305 stores data units 205 of a data packet 200 together in a portion of the input buffer 305. For example, the input buffer 305 may include pages, each of which is capable of storing each data unit 205 of a maximum sized data packet 200 specified for the packet switch 105. Further in this example, each page of the input buffer 305 may only store data units 205 of a single data packet 200 at a time. In this way, the packet engine 315 may determine data units 205 are in the same data packet 200 by determining that the data units 205 are contained in the same page of the input buffer 305. Moreover, a pointer in a mapping unit 410 of a virtual output queue 300 in the input port 125 may map the data units 205 of a data packet 200 by identifying the page of the input buffer 205 used to store the data units 205 of the data packet 200.

In various embodiments, the packet switch 105 initializes the old age indicator 325 and the counter 330 of each virtual output queue 300 upon power-up or reset of the packet switch 105. For example, the packet engine 315 of each input port 125 in the packet switch 105 may initialize the old age indicator 325 of each virtual output queue 300 in the input port 125 to indicate the virtual output queue 300 is young and initialize the counter 330 of each virtual output queue 300 in the input port 125 by setting the counter 330 of the virtual output queue 300 to zero. Further, the packet engine 315 of each input port 125 increments the counter 330 of each virtual output queue 300 in the input port 125 that is not selected by the arbiter 130 in an arbitration cycle. Additionally, the packet engine 315 compares the counter 330 of each virtual output queue 300 in the input port 125 with an old age threshold in each arbitration cycle. If the counter 330 of a virtual output queue 300 has reached the old age threshold, the packet engine 315 updates (e.g., sets) the old age indicator 325 of the virtual output queue 300 to indicate the virtual output queue 300 is old. In an alternative embodiment, if the counter 330 of a virtual output queue 300 has exceeded the old age threshold, the packet engine 315 updates (e.g., sets) the old age indicator 325 of the virtual output queue 300 to indicate the virtual output queue 300 is old.

In some embodiments, the arbiter 130 maintains the old age indicator 325 of each virtual output queue 300 in the packet switch 105 or the counter 330 of each virtual output queue 300 in the packet switch 105, or both. In some embodiments, the old age indicators 325 of the virtual output queues 300 in an input port 125 are external of the packet engine 315 in the input port 125. For example, the old age indicators 325 of the virtual output queues 300 in the packet switch 105 may be in the arbiter 130. In some embodiments, the counters 330 of the virtual output queues 300 in an input port 125 are external of the packet engine 315 in the input port 125. For example, the counters 330 of the virtual output queues 300 in the packet switch 105 may be in the arbiter 130. In some embodiments, the packet switch 105 maintains an individual old age threshold for each virtual output queue 300 in the packet switch 105.

In some embodiments, the packet switch 105 updates the old age indicator 325 of an old virtual output queue 300 when the virtual output queue 300 no longer maps a data unit 205 (e.g., the virtual output queue 300 is empty). In this way, the virtual output queue 300 remains old until each data unit 205 mapped by the virtual output queue 300 is unmapped from the virtual output queue 300. In one embodiment, the packet switch 105 stops incrementing the counter 330 of a virtual output queue 300 when the virtual output queue 300 becomes old. In some embodiments, the packet switch 105 resets the counter 330 of a virtual output queue 300 (e.g., sets the counter 330 to a value of zero) when the packet switch 105 updates the old age indicator 325 of the virtual output queue 300 to indicate the virtual output queue 300 is old. In other embodiments, the packet switch 105 resets the counter 330 of a virtual output queue 300 (e.g., sets the counter 330 to a value of zero) when the packet switch 105 updates the old age indicator 325 of the virtual output queue 300 to indicate the virtual output queue 300 is young.

Figure 5:
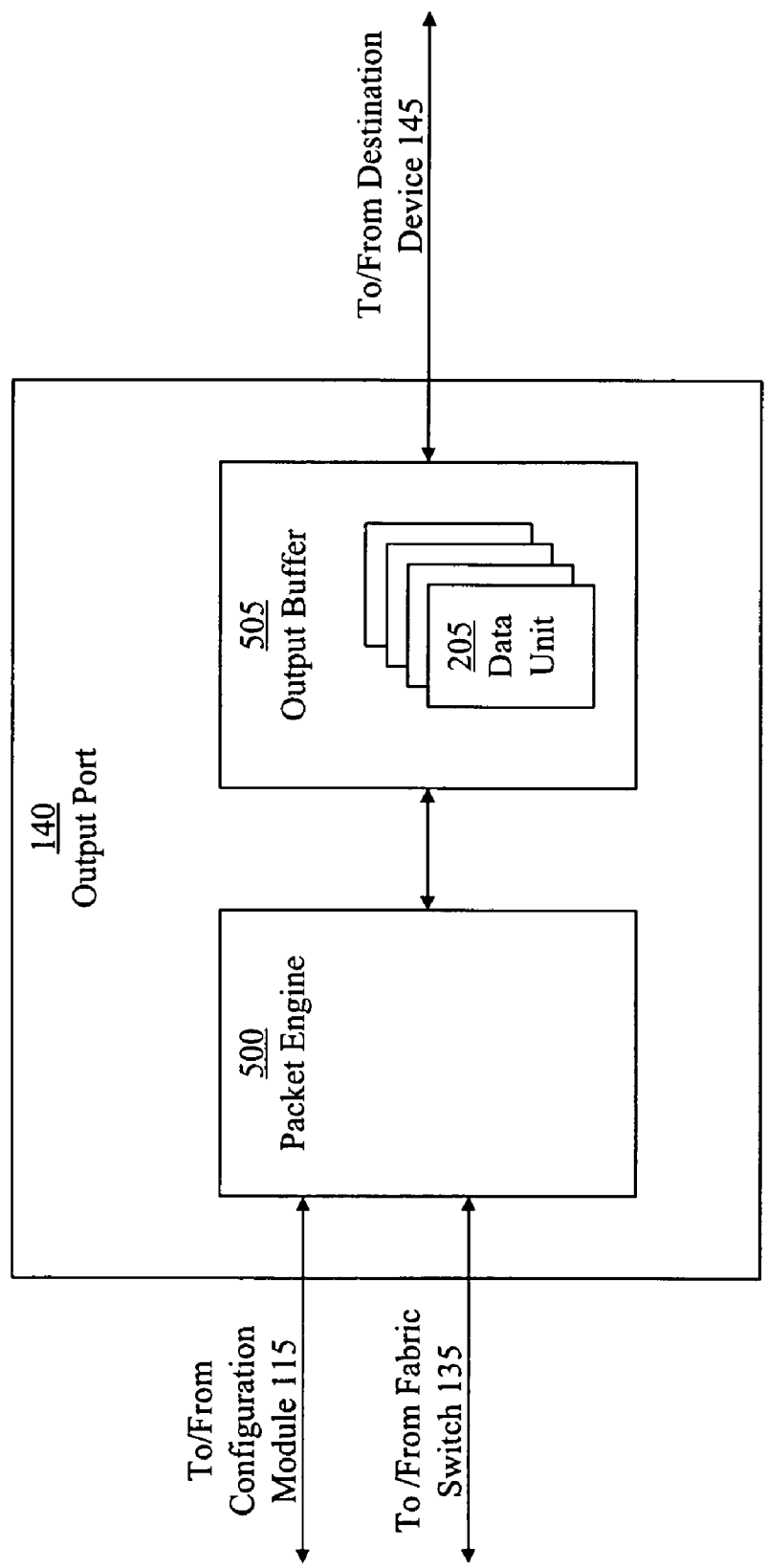
FIG. 5 is a block diagram of an output port of a packet switch, in accordance with an embodiment of the present invention.

FIG. 5 illustrates the output port 140, in accordance with an embodiment of the present invention. The output port 140 includes a packet engine 500 and an output buffer 505 coupled (e.g., connected) to the packet engine 500. The packet engine 500 receives data units 205 of data packets 200 from the input ports 125 through the switch fabric 135 and writes the data units 205 into the output buffer 505. In turn, the output buffer 505 stores the data units 205. Additionally, the packet engine 500 identifies data units 205 of a data packet 200 and the output port 140 outputs the data units 205 of the data packet 200 from the packet switch 105 to the destination device 145 corresponding to the output port 140.

In various embodiments, the output port 140 outputs the data units 205 of the data packet 200 contiguously to the destination device 145 corresponding to the output port 140 in the order in which the output port 140 received the data units 205. In this way, the output port 140 outputs the data packet 200 from the packet switch 105 as an atomic unit. Moreover, the output port 140 outputs each data unit 205 of the data packet 200 to the destination device 145 in the order in which the input port 125 sent the data units 205 to the switch fabric 135. In some embodiments, the packet engine 500 of the output port 140 stores data units 205 of a data packet 200 together in a portion of the output buffer 505. For example, the output buffer 505 may include pages, each of which is capable of storing each data unit 205 of a maximum sized data packet 200 specified for the packet switch 105. Further in this example, each page of the output buffer 505 may only store data units 205 of a single data packet 200 at a time. In this way, the packet engine 500 of the output port 140 may identify a data unit 205 of a data packet 200 based on the page containing the data unit 205.

In some embodiments, the packet engine 500 of output port 140 need not write each data unit 205 of a data packet 200 into the output buffer 505 before the output port 140 outputs the data units 205 of the data packet 200. For example, the output port 140 may output idle symbols between outputting consecutive data units 205 of the data packet 200 from the packet switch 105 without outputting a data unit 205 of another data packet 200 between any two of the consecutive data units 205. In this way, the output port 140 outputs the data units 205 of the data packet 200 from the packet switch 105 contiguously without the need to store each data unit 205 of the data packet 200 at the same time.

In various embodiments, the arbiter 130 is distributed among the input ports 125, the switch fabric 135, and the output ports 140. For example, the packet engines 315 in the input ports 125, the switch fabric 135, and the packet engines 500 in the output ports 140 may each include a portion of logic of the arbiter 130. In these embodiments, the input ports 125 communicate with the switch fabric 135 to perform arbitration for the input ports 125, and the switch fabric 135 communicates with the output ports 140 to perform arbitration for the output ports 140.

In further embodiments, the switch fabric 135 includes a buffered crossbar switch. In these embodiments, the input ports 125 and the switch fabric 135 perform arbitration on the input ports 125 to select virtual output queues 300 based on the old age indicators 325 of the virtual output queues 300 and the capacity of the switch fabric 135 to accept (e.g. store) data units 205 mapped by the virtual output queues 300. Additionally, the switch fabric 135 and the output ports 140 perform arbitration on the output ports 140 based on the capacity of the output ports 140 to accept (e.g. store) data units 205 from the switch fabric 135.

In various embodiments, the packet switch 105 identifies multicast data packets 200 mapped by the virtual output queues 300 in an input port 125 and contemporaneously routes a data unit 205 of the multicast data packet 200 through the packet switch 105. In some embodiments, the arbiter 130 selects virtual output queues 300 of an input port 125 in an arbitration cycle, each of which maps a data unit 205 of a multicast data packet 200 at the head 405 of the virtual output queue 300 and corresponds to an output port 140 having capacity to accept the data unit 205. In turn, the switch fabric 135 contemporaneously routes the data unit 205 from the input port 125 to each output port 140 corresponding to a selected virtual output queue 300 in the input port 125. Because the switch fabric 135 routes the data unit 205 from the input port 125 to more than one output port 140 in the arbitration cycle, throughput of the packet switch 105 is increased. Additionally, the latency of the data unit 205 of the multicast data packet 200 and the overall latency of the multicast data packet 200 are reduced in the packet switch 105, which increases performance of the packet switch 105.

In one embodiment, the arbiter 130 selects a virtual output queue 300 of an input port 125 in an arbitration cycle based on a scheduling algorithm, such as a round robin algorithm. Additionally, the arbiter 130 determines that the selected virtual output queue 300 maps a data unit 205 of a multicast data packet 200 at the head 405 of the selected virtual output queue 300. The arbiter 130 also identifies another virtual output queue 300 in the input port 125 that maps the data unit 205 of the multicast data packet 200 at the head 405 of the identified virtual output queue 300 and corresponds to an output port 140 having capacity to accept the data unit 205. Further, the arbiter 130 selects the identified virtual output queue 300 in the arbitration cycle, in addition to the virtual output queue 300 already selected, and the switch fabric 135 contemporaneously routes the data unit 205 from the input port 125 to the output ports 140 corresponding to the selected virtual output queues 300 in the input port 125.

For example, in a first phase of an arbitration cycle, the arbiter 130 may select an old virtual output queue 300 in the input port 125 mapping a multicast data packet 200 at the head 405 of the old virtual output queue 300 in which the output port 140 corresponding to the old virtual output queue 300 has capacity to accept a data unit 205 of the multicast data packet 200. Further, the arbiter 130 may identify a young virtual output queue 300 in the input port 125 mapping the multicast data packet 200 at the head 405 of the young virtual output queue 300. If the output port 140 corresponding to the young virtual output queue 300 has capacity to accept a data unit 205 of the multicast data packet 200, the arbiter 130 selects the young virtual output queue 300 in the first phase of the arbitration cycle in addition to the old virtual output queue 300.

As another example, in a second phase of an arbitration cycle, the arbiter 130 may select a young virtual output queue 300 in an input port 125 mapping a multicast data packet 200 at the head 405 of the young virtual output queue 300 in which the output port 140 corresponding to the young virtual output queue 300 has capacity to accept a data unit 205 of the multicast data packet 200. Further, the arbiter 130 may identify another young virtual output queue 300 in the input port 125 mapping the multicast data packet 200 at the head 405 of the young virtual output queue 300. If the output port 140 corresponding to the identified young virtual output queue 300 has capacity to accept a data unit 205 of the multicast data packet 200, the arbiter 130 selects the identified young virtual output queue 300 in the second phase of the arbitration cycle in addition to the young virtual output queue 300 in the input port 125 already selected by the arbiter 130.

In various embodiments, the packet switch 105 identifies a multicast data packet 200 in multiple virtual output queues 300 of an input port 125 and gives preference to selecting one or more of the virtual output queues 300 mapping the multicast data packet 200 in more than one arbitration cycle. In some embodiments, the packet switch 105 identifies a multicast data packet 200 mapped at the head 405 of a virtual output queue 300 of an input port 125 selected in an arbitration cycle in which the output port 140 corresponding to the virtual output queue 300 has capacity to accept a data unit 205 of the data packet 200. Further, the arbiter 130 identifies another virtual output queue 300 in the input port 125 mapping the multicast data packet 200 but the multicast data packet 200 is not presently serviceable from the identified virtual output queue. For example, the multicast data packet 200 is not presently serviceable from the identified virtual output queue 300 if the switch fabric 135 is not able to presently route a data unit 205 of the multicast data packet 200 from the identified virtual output queue 300 to the output port 140 corresponding to the identified virtual output queue 300 or the map unit 410 of the identified virtual output queue 300 mapping the multicast data packet 200 is not at the head 405 of the identified virtual output queue 300. If the identified virtual output queue 300 is young, the arbiter 130 modifies the old age indicator 325 of the identified virtual output queue 300 to indicate the identified virtual output queue 300 is old. In this way, the arbiter 130 gives preference to selecting the identified virtual output queue 300 in each subsequent arbitration cycle in which the identified virtual output queue 300 remains old. As a result, the latency of the data unit 205 of the multicast data packet 200 mapped by the identified virtual output queue 300 and the overall latency of the multicast data packet 200 are reduced in the packet switch 105, which increases performance of the packet switch 105.

For example, in a first phase of an arbitration cycle, the arbiter 130 may select an old virtual output queue 300 of an input port 125 mapping a multicast data packet 200 at the head 405 of the old virtual output queue 300. Further, the arbiter 130 may identify a young virtual output queue 300 in the input port 125 mapping the multicast data packet 200 and modify the old age indicator 325 of the identified virtual output queue 300 in the arbitration cycle to indicate the identified virtual output queue 300 is old. In this way, the arbiter 130 gives preference to selecting the identified virtual output queue 300 in each subsequent arbitration cycle in which the identified virtual output queue 300 remains old.

As another example, in a second phase of an arbitration cycle, the arbiter 130 may select a young virtual output queue 300 in an input port 125 mapping a data unit 205 of a multicast data packet 200 at the head 405 of the young virtual output queue 300. Further, the arbiter 130 may identify another young virtual output queue 300 in the input port 125 mapping the data unit 205 of the multicast data packet 200 in which the multicast data packet 200 is not presently serviceable and modify the old age indicator 325 of the identified virtual output queue 300 in the second phase to indicate the identified virtual output queue 300 is old. In this way, the arbiter 130 gives preference to the identified virtual output queue 300 in subsequent arbitration cycles in which the identified virtual output queue 300 remains old.

FIGS. 6A-E illustrate virtual output queues 300 in an input port 125 of the packet switch 105, in accordance with an embodiment of the present invention. Each of the virtual output queues 300 (e.g., the virtual output queues 300a-c) includes map units 410 (e.g., map units 410a-l) for mapping data packets 200 received by the input port 125 to the output port 140 corresponding to the virtual output queue 300. Each map unit 410 of a virtual output queue 300 mapping a data packet 200 having a data unit 205 stored in the input buffer 305 of the input port 125 contains a pointer identifying the storage location of the data unit 205 in the input buffer 305. In this way, the map unit 410 of the virtual output queue 300 maps the data unit 205 identified by the pointer contained in the map unit 410 to the output port 140 corresponding to the virtual output queue 300. Moreover, a map unit 410 of a virtual output queue 300 that does not presently map a data packet 200 need not contain a pointer identifying a storage location in the input buffer 305 of the input port 125. For example, the pointer of a map unit 410 not presently mapping a data packet 200 may be a null pointer.

In various embodiments, each of the virtual output queues 300 is a first-in-first-out (FIFO) buffer. For example, each of the virtual output queues 300 may be a shift register and each map unit 410 in the virtual output queue 300 may be a storage location in the shift register for storing a pointer for identifying a storage location for storing data units 205 of a data packet 200 in the input buffer 305 of the input port 125. For instance, a pointer may include data bits identifying a storage location containing a data unit 205 in the input buffer 305 of the input port 125.

Figure 6A:
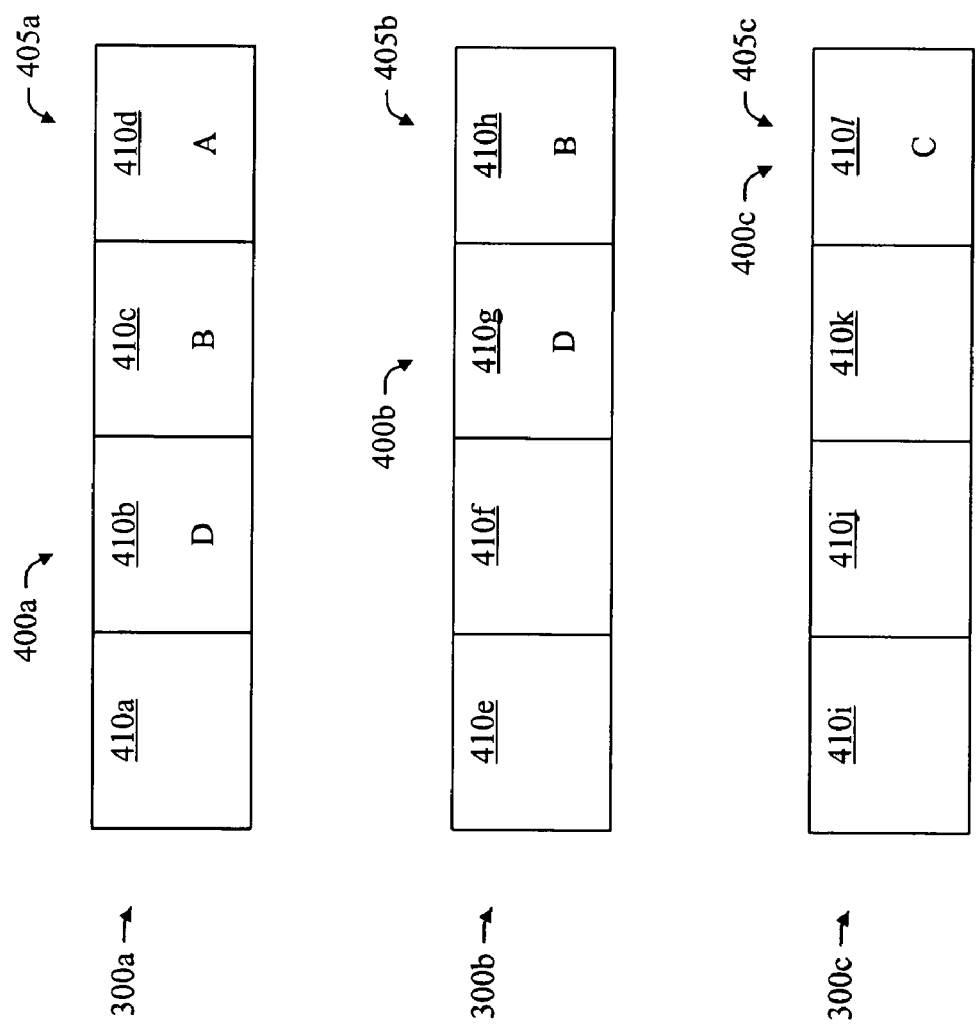
FIGS. 6A-E are block diagrams of virtual output queues in an input port of a packet switch, in accordance with an embodiment of the present invention.

As illustrated in FIG. 6A, the virtual output queue 300a includes map units 410a-d, the virtual output queue 300b includes map units 410e-h, and the virtual output queue 300c includes map units 410i-l. The map unit 410d at the head 405a of the virtual output queue 300a contains a pointer A identifying a data unit 205 of a first data packet 200 stored in the input buffer 305 of the input port 125. The map unit 410c of the virtual output queue 300a and the map unit 410h at the head 405b of the virtual output queue 300b each contain a pointer B identifying a data unit 205 of a second data packet 200 stored in the input buffer 305 of the input port 125. The map unit 410l at the tail 400c and the head 405c of the virtual output queue 300c contains a pointer C identifying a data unit 205 of a third data packet 200 stored in the input buffer 305 of the input port 125. The map unit 410b at the tail 400a of the virtual output queue 300a and the map unit 410g at the tail 400b of the virtual output queue 300b each contain a pointer D identifying a data unit 205 of a fourth data packet 200 stored in the input buffer 305 of the input port 125. Moreover, the second data packet 200 including a data unit 205 identified by the pointer B is a multicast data packet 200 and the fourth data packet 200 including a data unit 205 identified by the pointer D is a multicast data packet 200.

As also illustrated in FIG. 6A, the map unit 410a of the virtual output queue 300a is not presently mapping a data unit 205 stored in the input buffer 305 of the input port 125. Further, each of the map unit 410e and the map unit 410f of the virtual output queue 300b are not presently mapping a data unit 205 stored in the input buffer 305 of the input port 125. Each of the map unit 410i, the map unit 410j, and the map unit 410k of the virtual output queue 300c are not presenting mapping a data unit 205 stored in the input buffer 305 of the input port 125.

In this exemplary embodiment, each of the virtual output queues 300 are initially young as indicated by the old age indicators 325 of the virtual output queues 300. Further, the arbiter 130 selects the virtual output queue 300b in an arbitration cycle. Additionally, the arbiter 130 identifies the virtual output queue 300a because the map unit 410c of the virtual output queue 300a maps the same data unit 205 mapped by the map unit 410h at the head 405b of the virtual output queue 300b. Further, the arbiter 130 updates the old age indicator 325 of the virtual output queue 300a to indicate the virtual output queue 300a is old. In turn, the packet switch 105 routes the data unit 205 of the second data packet 200 mapped by the map unit 410h at the head 405b of the virtual output queue 300b, and identified by the pointer B in the map unit 410h, to the output port 140 corresponding to the virtual output queue 300b. Further, the packet engine 315 of the input port 125 updates the virtual output queue 300b to unmap the data unit 205 identified by the pointer B in the map unit 410h from the virtual output queue 300b.

Figure 6B:
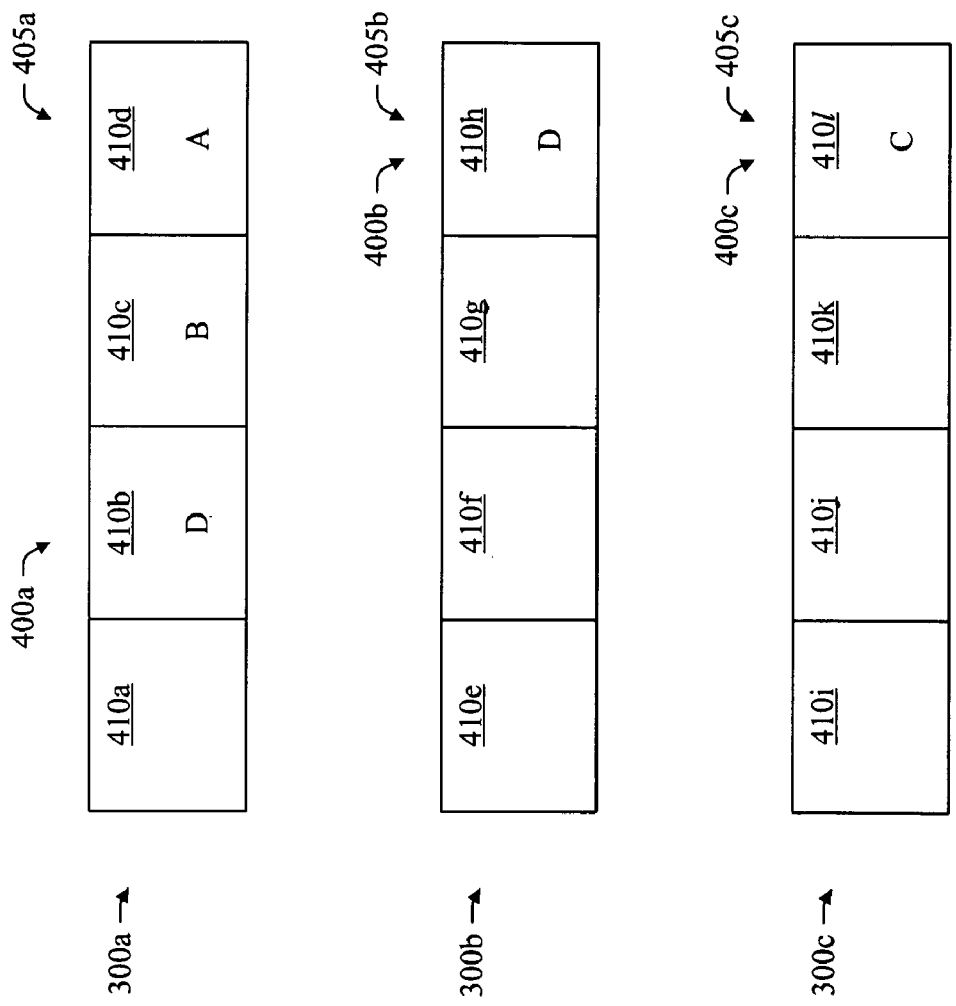

FIG. 6B illustrates the virtual output queues 300 in the input port 125 of the packet switch 105, in the next arbitration cycle. As illustrated in FIG. 6B, the input port 125 has advanced the pointer D from the map unit 410g of the virtual output queue 300b to the map unit 410h at the head 405b of the virtual output queue 300b. In this arbitration cycle, the arbiter 130 gives preference to the virtual output queue 300a because the virtual output queue 300a is old. Moreover, the arbiter 130 selects the virtual output queue 300a in the arbitration cycle. In turn, the packet switch 105 routes the data unit 205 of the first data packet 200 mapped by the map unit 410d at the head 405a of the virtual output queue 300a, and identified by the pointer A in the map unit 410d, to the output port 140 corresponding to the virtual output queue 300a. Further, the packet engine 315 of the input port 125 updates the virtual output queue 300a to unmap the data unit 205 identified by the pointer A in the map unit 410d from the virtual output queue 300a.

Figure 6C:
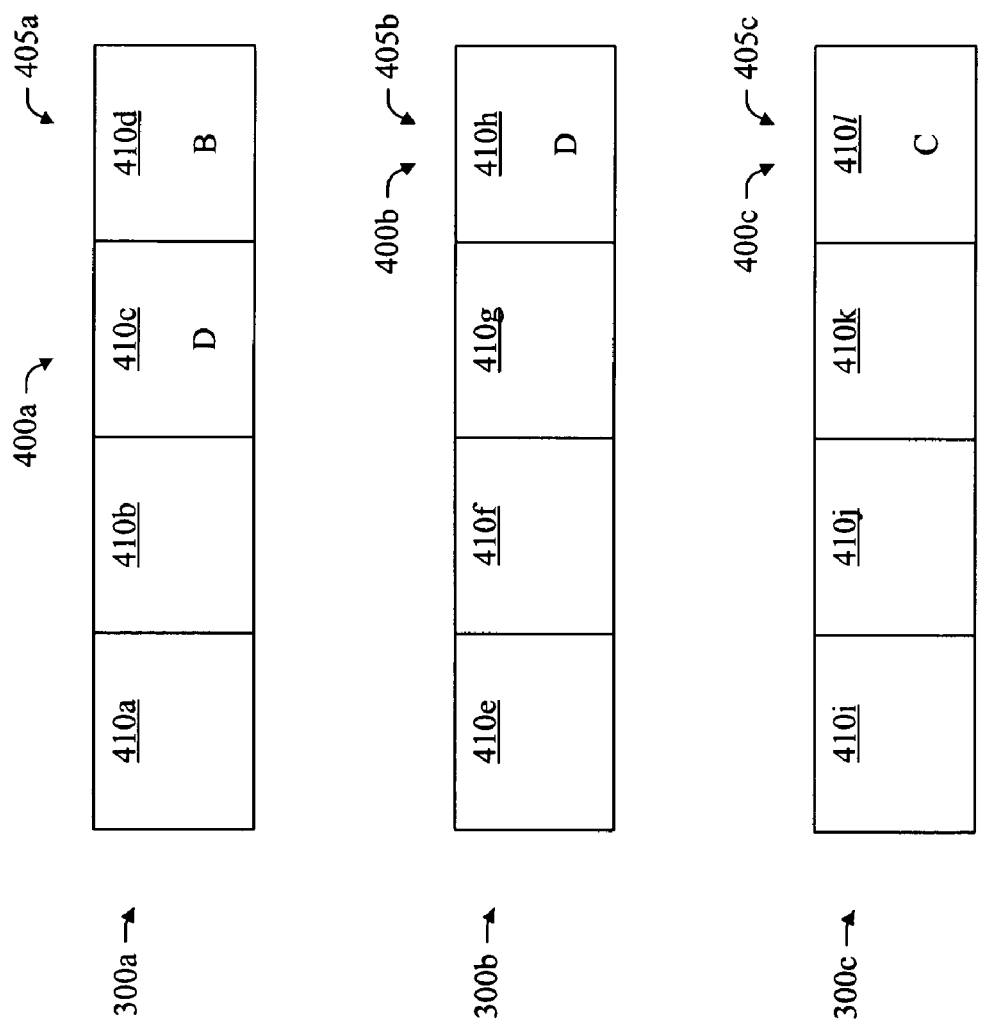

FIG. 6C illustrates the virtual output queues 300 in the input port 125 of the packet switch 105, in the next arbitration cycle. As illustrated in FIG. 6C, the input port 125 has advanced the pointer B from the map unit 410c of the virtual output queue 300a to the map unit 410d at the head 405a of the virtual output queue 300a. Additionally, the input port 125 has advanced the pointer D from the map unit 410b of the virtual output queue 300a to the map unit 410c of the virtual output queue 300a.

In this arbitration cycle, the arbiter 130 gives preference to the virtual output queue 300a because the virtual output queue 300a is old. Moreover, the arbiter 130 selects the virtual output queue 300a. In turn, the packet switch 105 routes the data unit 205 of the second data packet 200 mapped by the map unit 410d at the head 405a of the virtual output queue 300a, and identified by the pointer B in the map unit 410d, to the output port 140 corresponding to the virtual output queue 300a. Further, the packet engine 315 of the input port 125 updates the virtual output queue 300a to unmap the data unit 205 identified by the pointer B in the map unit 410d from the virtual output queue 300a.

As may be envisioned from FIGS. 6A-6C, the arbiter 130 has given preference to routing the data unit 205 of the second data packet 200, which is a multicast data packet 200, by updating the virtual output queue 300a to indicate the virtual output queue 300a is old. In this way, the latency of the second data packet 200 is reduced in the packet switch 105, which increases performance of the packet switch 105.

Figure 6D:
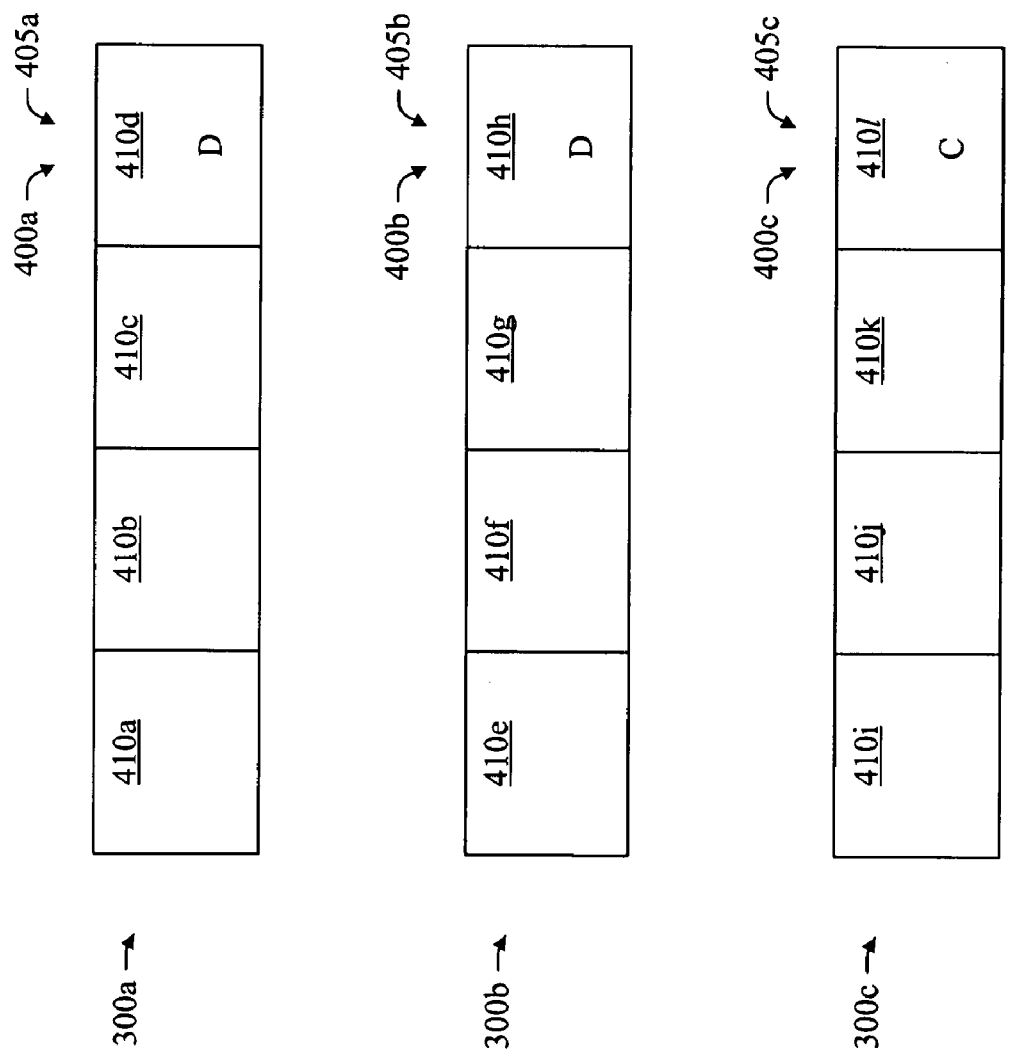

FIG. 6D illustrates the virtual output queues 300 in the input port 125 of the packet switch 105, in the next arbitration cycle. As illustrated in FIG. 6D, the input port 125 has advanced the pointer D from the map unit 410c of the virtual output queue 300a to the map unit 410d at the head 405a of the virtual output queue 300a. In this arbitration cycle, the arbiter 130 gives preference to the virtual output queue 300a because the virtual output queue 300a is old. Moreover, the arbiter 130 selects the virtual output queue 300a. Additionally, the arbiter 130 identifies and selects the virtual output queue 300b because the map unit 410h at the head 405b of the virtual output queue 300b maps the same data unit 205 mapped at the head 405a of the virtual output queue 300a, and identified by the pointer D.

The packet switch 105 routes the data unit 205 mapped by the map unit 410d at the head 405a of the virtual output queue 300a and mapped by the map unit 410h at the head 405b of the virtual output queue 300b to both the output port 140 corresponding to the virtual output queue 300a and the output port 140 corresponding to the virtual output queue 300b. Additionally, the packet engine 315 of the input port 125 updates the virtual output queue 300a to unmap the data unit 205 mapped by the map unit 410d at the head 405a of the virtual output queue 300a from the virtual output queue 300a. Further, the packet engine 315 of the input port 125 updates the old age indicator 325 of the virtual output queue 300a to indicate the virtual output queue 300a is young because the virtual output queue 300 no longer maps a data unit 205 (e.g., the virtual output queue 300 is empty). Additionally, the packet engine 315 of the input port 125 updates the virtual output queue 300b to unmap the data unit 205 mapped by the map unit 410h at the head 405b of the virtual output queue 300b from the virtual output queue 300b.

As may be envisioned from FIGS. 6C and 6D, the arbiter 130 has given preference to routing the data unit 205 of the fourth data packet 200 identified by the pointer D by selecting the virtual output queue 300b in addition to selecting the virtual output queue 300a in the arbitration. Moreover, the switch fabric 135 has routed the data unit 205 of the fourth data packet 200, which is a multicast data packet 200, to two output ports 140 of the packet switch 105 in the arbitration cycle. In this way, throughput of the packet switch 105 is increased. Additionally, the latency of the fourth data packet 200 is reduced in the packet switch 105, which increases performance of the packet switch 105.

Figure 6E:
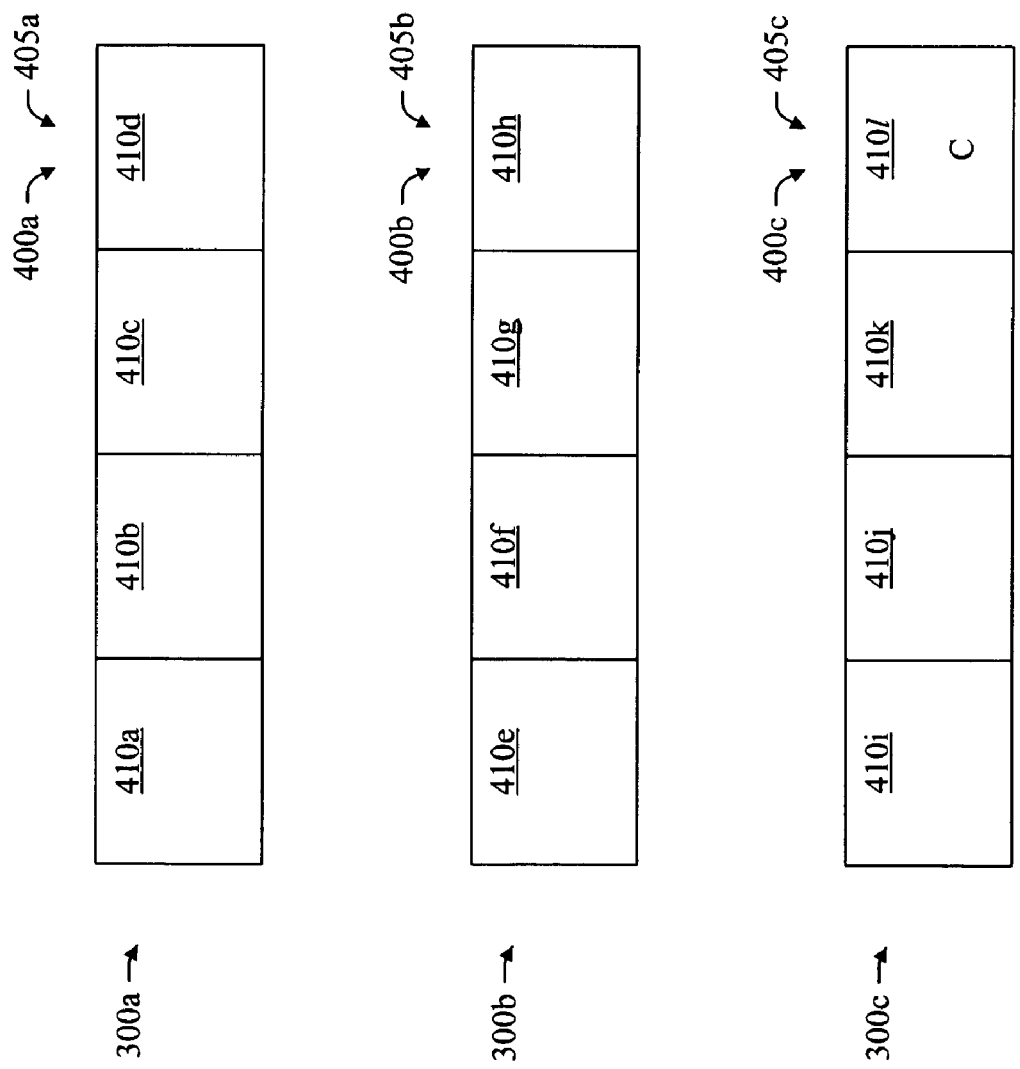

FIG. 6E illustrates the virtual output queues 300 in the input port 125 of the packet switch 105, in the next arbitration cycle. In this arbitration cycle, the arbiter 130 selects the virtual output queue 300c. In turn, the packet switch 105 routes the data unit 205 of the third data packet 200 mapped by the map unit 410l at the head 405c of the virtual output queue 300c, and identified by the pointer C in the map unit 410d, to the output port 140 corresponding to the virtual output queue 300c. Further, the packet engine 315 of the input port 125 updates the virtual output queue 300c to unmap the data unit 205 of the third data packet 200 identified by the pointer C in the map unit 410l from the virtual output queue 300c.

Figure 7:
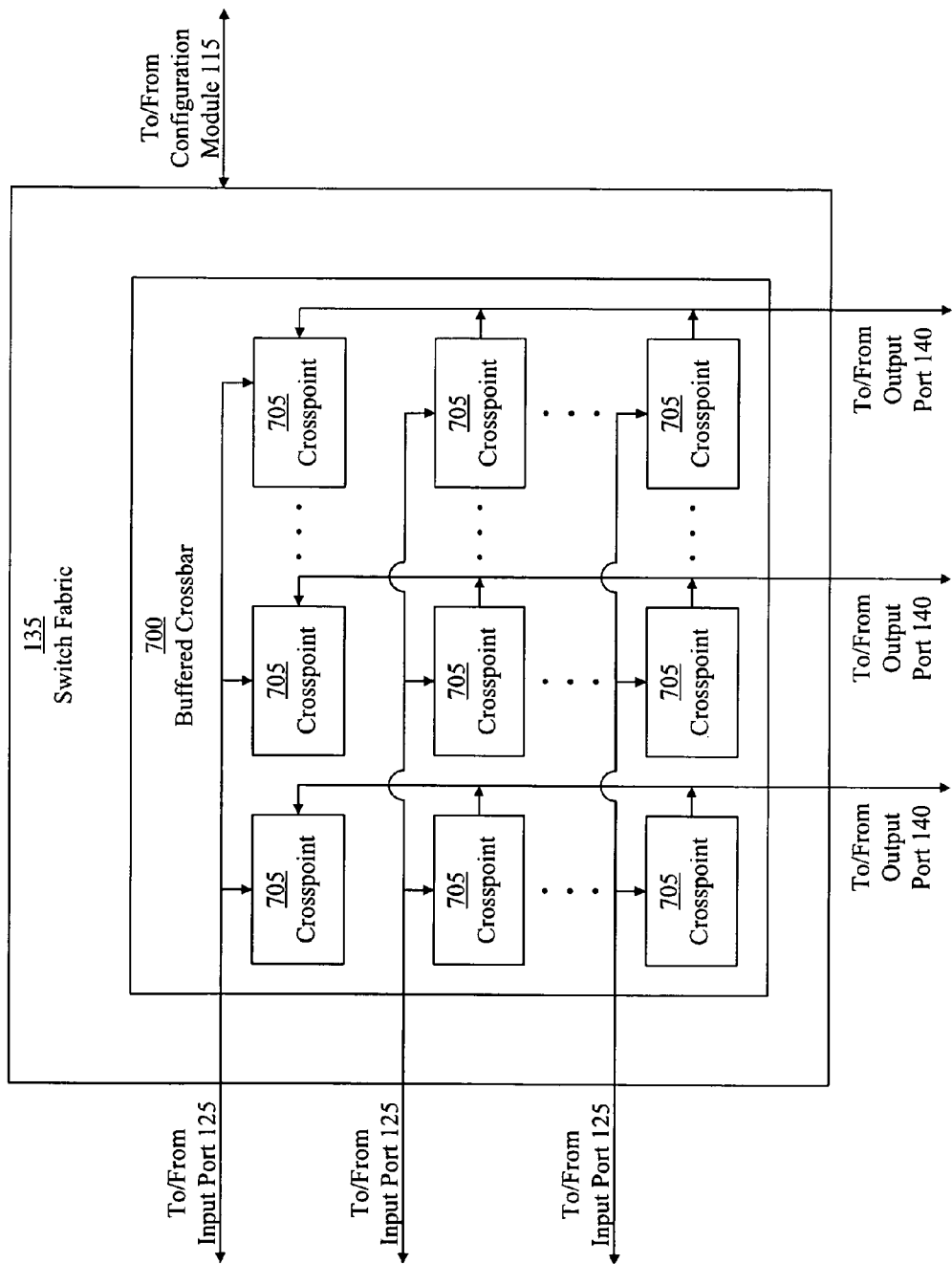
FIG. 7 is a block diagram of a switch fabric, in accordance with an embodiment of the present invention.

FIG. 7 is a block diagram of the switch fabric 135, in accordance with an embodiment of the present invention. In this embodiment, the switch fabric 135 includes a buffered crossbar 700. The buffered crossbar 700 includes crosspoints 705 interconnected with each other. Each of the crosspoints 705 is coupled (e.g., connected) to a corresponding input port 125 and a corresponding output port 140 of the packet switch 105. As may be envisioned from FIG. 7, the crosspoints 705 form a square matrix including rows of crosspoints 705 and columns of crosspoints 705. Each crosspoint 705 in a row of the matrix corresponds to an input port 125 of the packet switch 105 and is coupled (e.g., connected) to the input port 125. Moreover, each crosspoint 705 in a column of the matrix corresponds to an output port 140 of the packet switch 105 and is coupled (e.g., connected) to the output port 140. In this way, each of the input ports 125 is coupled to an output port 140 through a crosspoint 705 in the buffered crossbar 700.

Each crosspoint 705 receives data units 205 of a data packet 200 from the input port 125 corresponding to the crosspoint 705, stores the data units 205 of the data packet 200, and sends (e.g., routes) the data units 205 of the data packet 200 to the output port 140 corresponding to the crosspoint 705. In one embodiment, the crosspoint 705 has a storage capacity for storing one data unit 205 of a data packet 200. In this way, the crosspoint 705 is capable of storing a single data unit 205 of a data packet 200 at a given time. In other embodiments, the crosspoint 705 has a storage capacity for storing more than one data unit 205 of a data packet 200 and is capable of storing more than one data unit 205 of the data packet 200 at a given time. In some embodiments, the crosspoint 705 is capable of storing data units 205 of multiple data packets 200 at the same time.

In various embodiments, the arbiter 130 is distributed among the input ports 125, the crosspoints 705, and the output ports 140. In these embodiments, each input port 125 and the crosspoints 705 coupled to the input port 125 (e.g., crosspoints 705 in the row of the matrix corresponding to the input port 125) perform arbitration by selecting one of the crosspoints 705 coupled to the input port 125 based on the capacity of the crosspoint 705 to accept a data unit 205. For example, a crosspoint 705 may have capacity to accept a data unit 205 of a data packet 200 from an input port 125 when the crosspoint 705 has storage capacity to store the data unit 205. In some embodiments, each input port 125 and the crosspoints 705 coupled to the input port 125 perform arbitration on the crosspoints 705 coupled to the input port 125 by using a round robin algorithm.

Additionally, each output port 140 and the crosspoints 705 coupled to the output port 140 (e.g., crosspoints 705 in the column of the matrix corresponding to the output port 140) perform arbitration by selecting one of the crosspoints 705 coupled to the output port 140 and containing a data unit 205 of a data packet 200 to be routed to the output port 140. In various embodiments, each output port 140 and the crosspoints 705 coupled to the output port 140 perform arbitration on the crosspoints 705 coupled to the output port 140 by using a credit based arbitration algorithm, such as a proportional fairness algorithm or a deficit round robin algorithm.

Figure 8:
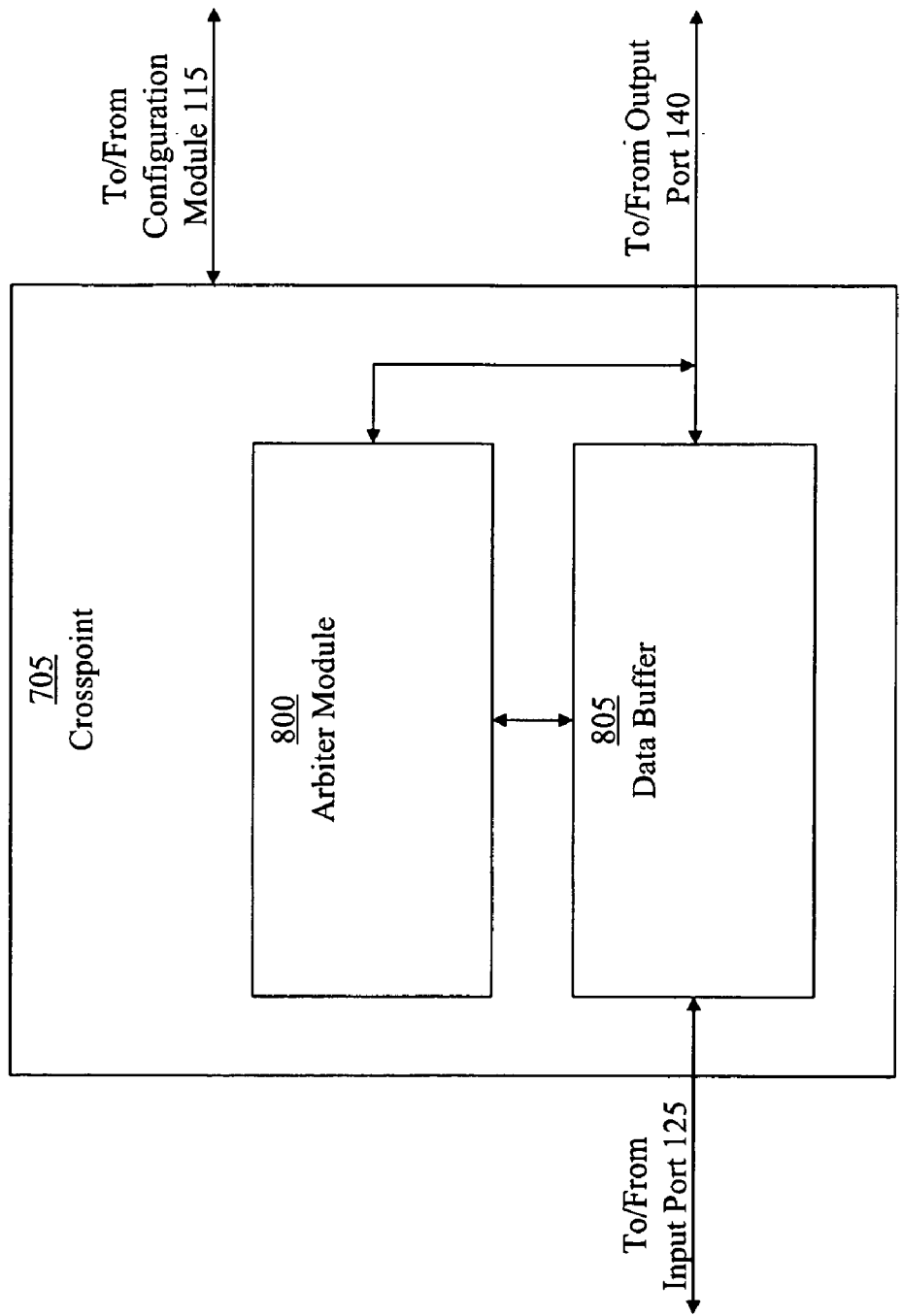
FIG. 8 is a block diagram of a crosspoint, in accordance with an embodiment of the present invention.

FIG. 8 is a block diagram of the crosspoint 705, in accordance with an embodiment of the present invention. The crosspoint 705 includes an arbiter module 800 and a data buffer 805 coupled (e.g., connected) to the arbiter module 800. The data buffer 805 receives data units 205 of data packets 200 from the input port 125 corresponding to the crosspoint 705 and stores the data units 205 of the data packets 200. In this way, the data buffer 805 is a storage location in the crosspoint 705. The arbiter modules 800 in the buffered crossbar 700 are part of the arbiter 130 and perform arbitration in the packet switch 105 in conjunction with the input ports 125 and the output ports 140 of the packet switch 105. In this way, the arbiter 130 is distributed in the packet switch 105.

In various embodiments, the arbiter modules 800 of the crosspoints 705 in the buffered crossbar 700 corresponding to an input port 125 (e.g., the crosspoints 705 in the row of the matrix corresponding to the input port 125) and the packet engine 315 of the input port 125 arbitrate for access to the crosspoints 705 corresponding to the input port 125. The arbiter module 800 of at least one crosspoint 705 corresponding to the input port 125 that is ready to receive a data unit 205 from the input port 125 grants access to the input port 125. The input port 125 selects a crosspoint 705 that granted access to the input port 125 and sends a data unit 205 to the crosspoint 705. In turn, the crosspoint 705 stores the data unit 205 in the data buffer 805 of the crosspoint 705. In this way, the data buffer 805 is a storage location for the data unit 205 in the crosspoint 705.

The packet engine 500 of an output port 140 arbitrates for access to the crosspoints 705 in the buffered crossbar 700 corresponding to the output port 140 (e.g., crosspoints 705 in the column of the matrix corresponding to the output port 140). The arbiter module 800 of at least one crosspoint 705 corresponding to the output port 140 and containing a data unit 205 ready to be sent to the output port 140 grants access to the output port 140. In turn, the packet engine 500 of the output port 140 selects a crosspoint 705 that granted access to the output port 140, reads one or more data units 205 from the crosspoint 705, and stores each data unit 205 of the data packet 200 in the output buffer 505 of the output port 140.

In some embodiments, the arbiter module 800 of a crosspoint 705 communicates with the output port 140 corresponding to the crosspoint 705 to send a data unit 205 to the output port 140. For example, the output port 140 may provide a signal to the arbiter module 800 indicating that the output port 140 is ready to receive a data unit 205. In turn, the arbiter module 800 may obtain access to the output port 140 and send a data unit 205 from the data buffer 805 to the output port 140. As another example, the arbiter module 800 may provide a signal to the output port 140 indicating that the data buffer 805 contains a data unit 205. In this example, the packet engine 500 of the output port 140 selects the crosspoint 705 containing the arbiter module 800 and reads the data unit 205 from the data buffer 805 of the crosspoint 705. In this way, the crosspoint 705 sends the data unit 205 to the output port 140.

Figure 9:
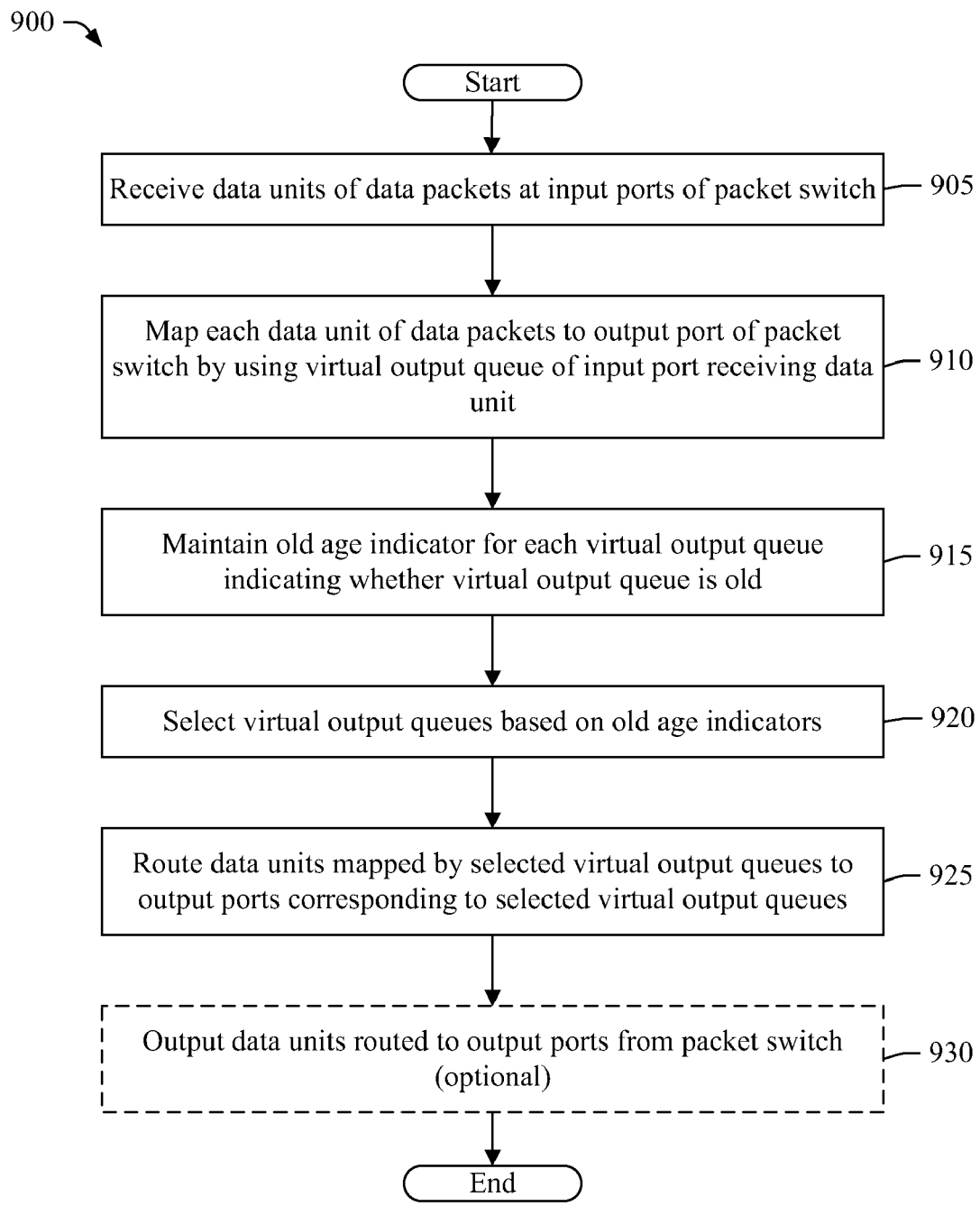
FIG. 9 is a flow chart of a method of routing data packets through a packet switch by using virtual output queues in the packet switch.

FIG. 9 illustrates a method 900 of routing data packets through a packet switch 105 by using virtual output queues 300 in the packet switch 105. In step 905, data units of data packets are received at input ports of a packet switch. In various embodiments, input ports 125 of the packet switch 105 receive data units 205 of data packets 200 and each input port 125 receiving a data unit 205 writes the data unit 205 into the input buffer 305 of the input port 125. The method 900 then proceeds to step 910.

In step 910, each data unit received at an input port of the packet switch is mapped to an output port of the packet switch by using a virtual output queue of the input port. In various embodiments, each input port 125 receiving a data unit 205 maps the data unit 205 to an output port 140 of the packet switch 105 by using the virtual output queue 300 corresponding to the output port 140 in the input port 125. In some embodiments, the packet engine 315 of the input port 125 identifies an output port 140 of the packet switch 105 for a data unit 205 stored in the input buffer 305 of the input port 125 based on contents of the data packet 200 including the data unit 205. For example, the packet engine 315 may identify the output port 140 for the data unit 205 based on a destination address in the data packet 200 including the data unit 205. Further, the packet engine 315 updates the virtual output queue 300 corresponding to the identified output port 140 to map the data unit 205 to the output port 140. In various embodiments, the packet engine 315 updates the virtual output queue 300 corresponding to the identified output port 140 by updating a map unit 410 in the virtual output queue 300. For example, the packet engine 315 may update the map unit 410 of the virtual output queue 300 by writing a pointer identifying the storage location of the data unit 205 in the input buffer 305 into the map unit 410. The method 900 then proceeds to step 915.

In step 915, an old age indicator is maintained for each virtual output queue indicating whether the virtual output queue is old. In various embodiments, each input port 125 maintains the old age indicator 325 of each virtual output queue 300 in the input port 125. In some embodiments, the packet engine 315 of the input port 125 initializes the old age indicator 325 of each virtual output queue 300 in the input port 125 to indicate the virtual output queue 300 is young. Additionally, the packet engine 315 initializes the counters 330 of the virtual output queues 300 in the input port 125 to zero. Further, the packet engine 315 increments the counter 330 of each virtual output queue 300 in the input port 125 in each arbitration cycle in which the arbiter 130 does not select the virtual output queue 300 and the virtual output queue 300 maps at least one data unit 205 (e.g., the virtual output queue 300 is not empty).

Also in each arbitration cycle, the packet engine 315 compares the counter 330 of each virtual output queue 300 with an old age threshold and updates the old age indicator 325 of the virtual output queue 300 based on the result of the comparison. In one embodiment, the packet engine 315 updates the old age indicator 325 of a virtual output queue 300 if the counter 330 of the virtual output queue 300 reaches the old age threshold. In another embodiment, the packet engine 315 updates the old age indicator 325 of the virtual output queue 300 if the counter 330 of the virtual output queue 300 exceeds the old age threshold. In other embodiments, the arbiter 130 maintains the old age indicator 325 of each virtual output queue 300 in the packet switch 105 or the counter 330 of each virtual output queue 300 in the packet switch 105, or both. The method 900 then proceeds to step 920.

In step 920, virtual output queues are selected based on the old age indicators. In various embodiments, the arbiter 130 selects virtual output queues 300 based on the old age indicators 325 of the virtual output queues 300 in the packet switch 105. In one embodiment, the arbiter 130 uses a scheduling algorithm in a first phase of an arbitration cycle to select old virtual output queues 300 and a scheduling algorithm in a second phase of the arbitration cycle to select young virtual output queues 300. In this way, the arbiter 130 gives preference to any old virtual output queue 300 in the packet switch 105 over any young virtual output queue 300 in the packet switch 105. In one embodiment, the scheduling algorithm used by the arbiter 130 in the first phase of the arbitration cycle is a round robin algorithm and the scheduling algorithm used by the arbiter 130 in the second phase of the arbitration cycle is a round robin algorithm. Moreover, the round robin algorithms share a pointer indicating the last virtual output queue 300 selected by the arbiter 130 to promote fairness in the selection of the virtual output queues 300 in the arbitration cycle. The method 900 then proceeds to step 925.

In step 925, data units mapped by the selected virtual output queues are routed to the output ports corresponding to the selected virtual output queues. In various embodiments, the switch fabric 135 in the packet switch 105 routes data units 205 mapped at the heads 405 of the selected virtual output queues 300 to the output ports 140 corresponding to the virtual output queues 300. For example, the switch fabric 135 may contemporaneously route each data unit 205 mapped at the head 405 of a selected virtual output queue 300 to the output port 140 corresponding to the selected virtual output queue 300 in the arbitration cycle. The method 900 then proceeds to step 930.

In optional step 930, the data units routed to the output ports are output from the packet switch. In various embodiments, each output port 140 of the packet switch 105 receiving a data unit 205 routed to the output port 140 outputs the data unit 205 from the packet switch 105. In one embodiment, the packet engine 500 of an output port 140 receiving a data unit 205 routed to the output port 140 writes the data unit 205 into the output buffer 505 of the output port 140. Additionally, the packet engine 500 identifies data units 205 of a data packet 200 stored in the output buffer 505 of the output port 140 and contiguously outputs the data units 205 of the data packet 200 from the packet switch 105 to the destination device 145 corresponding to the output port 140. The method 900 then ends.

In various embodiments, the method 900 may include more or fewer steps than the steps 905-930 described above and illustrated in FIG. 9. In some embodiments, one or more of the steps 905-930 of the method 900 may be performed in parallel or substantially simultaneously. For example, step 915 may be performed in parallel with step 920. In various embodiments, the steps 905-930 of the method 900 may be performed in a different order than the order described above and illustrated in FIG. 9.

Figure 10:
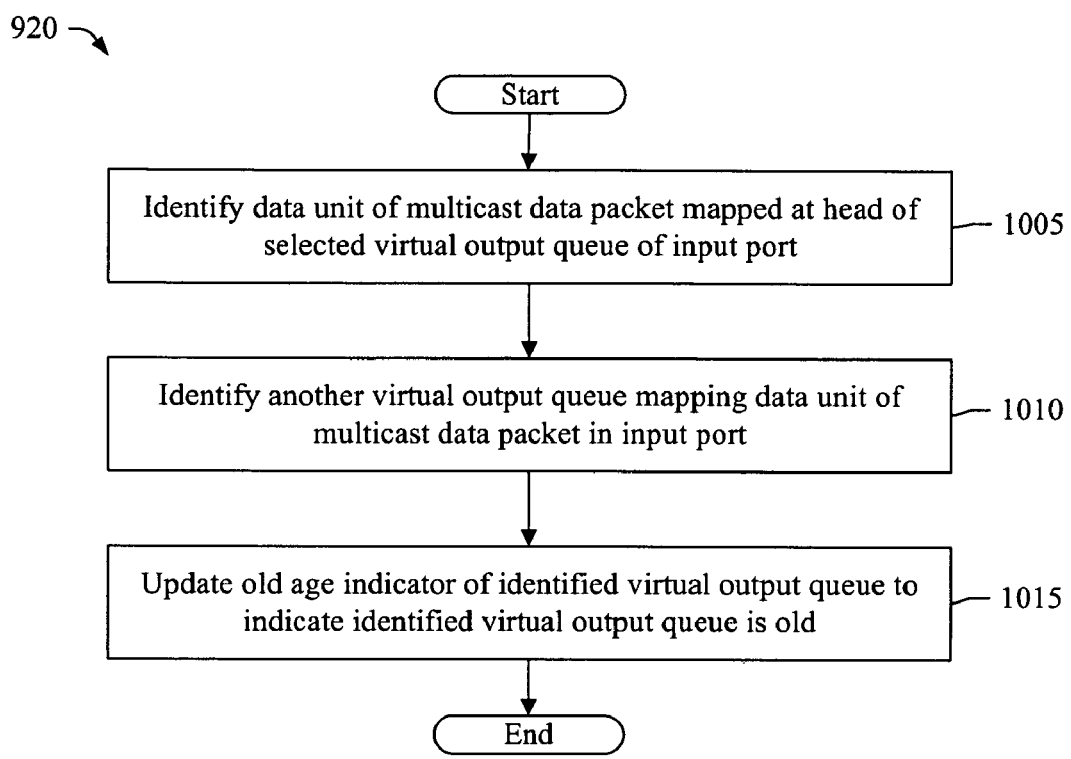
FIG. 10 is a flow chart of a portion of a method of routing data packets through a packet switch by using virtual output queues in the packet switch.

FIG. 10 illustrates a portion of the method 900 for routing data packets through a packet switch 105 by using virtual output queues 300 in the packet switch 105, in accordance with an embodiment of the present invention. The portion of the method 900 illustrated in FIG. 10 is performed in step 920 of the method 900 illustrated in FIG. 9.

In step 1005, a data unit of a multicast data packet mapped at the head of a selected virtual output queue is identified. In various embodiments, the packet switch 105 of the input port 125 identifies a data unit 205 of a multicast data packet 200 mapped at the head 405 of a selected virtual output queue 300 (e.g., a first virtual output queue 300) of the input port 125 in the arbitration cycle. In some embodiments, the arbiter 130 identifies the data unit 205 of the multicast data packet 200 mapped at the head 405 of the selected virtual output queue 300. In other embodiments, the packet engine 315 of the input port 125 including the selected virtual output queue 300 identifies the data unit 205 of the multicast data packet 200 mapped at the head 405 of the selected virtual output queue 300. The portion of the method 900 then proceeds to step 1010.

In step 1010, another virtual output queue in the input port mapping the data unit of the multicast data packet 200 is identified. In various embodiments, the packet switch 105 identifies another virtual output queue 300 (e.g., a second virtual output queue 300) in the input port 125 mapping the data unit 205 of the multicast data packet 200. Moreover, the multicast data packet 200 mapped by the identified virtual output queue 300 is not presently serviceable (e.g., the switch fabric 135 is not able to presently route the data unit 205 of the multicast data packet 200 from the identified virtual output queue 300 to the output port 140 corresponding to the identified virtual output queue 300 or the map unit 410 of the identified virtual output queue 300 mapping the data unit 205 of the multicast data packet 200 is not at the head 405 of the identified virtual output queue 300). In some embodiments, the arbiter 130 identifies the virtual output queue 300 mapping the data unit 205 of the multicast data packet 200 in the input port 125. In other embodiments, the packet engine 315 of the input port 125 identifies the virtual output queue 300 mapping the data unit 205 of the multicast data packet 200 in the input port 125. The portion of the method 900 then proceeds to step 1015.

In step 1015, the old age indicator of the identified virtual output queue is updated to indicate the identified virtual output queue is old. In various embodiments, the packet switch 105 updates the old age indicator 325 of the identified virtual output queue 300 (e.g., the second virtual output queue 300) in the arbitration cycle to indicate the identified virtual output queue 300 is old. For example, the old age indicator 325 of the identified virtual output queue 300 may indicate the identified virtual output queue 300 is young and the packet switch 105 may update the old age indicator 325 to indicate the identified virtual output queue 300 is now old. Because the packet switch 105 updates the old age indicator 325 of the identified virtual output queue 300 (e.g., the second virtual output queue 300) to indicate the identified virtual output queue 300 is old, the arbiter 130 gives preference to the identified virtual output queue 300 in the subsequent arbitration cycle. For example, the arbiter 130 may select the identified virtual output queue 300 in a first phase of the next arbitration cycle.

In some embodiments, the arbiter 130 updates the old age indicator 325 of the identified virtual output queue 300 (e.g., the second virtual output queue 300) to indicate the identified virtual output queue 300 is old. In other embodiments, the packet engine 315 of the input port 125 including the identified virtual output queue 300 updates the old age indicator 325 of the identified virtual output queue 300 to indicate the identified virtual output queue 300 is old. This portion of the method 900 then ends.

In various embodiments, the portion of the method 900 illustrated in FIG. 10 may include more or fewer steps than the steps 1005-1015 described above and illustrated in FIG. 10. In some embodiments, one or more of the steps 1005-1015 of the method 900 may be performed in parallel or substantially simultaneously. In various embodiments, the steps 1005-1015 of the method 900 may be performed in a different order than the order described above and illustrated in FIG. 10.

Figure 11:
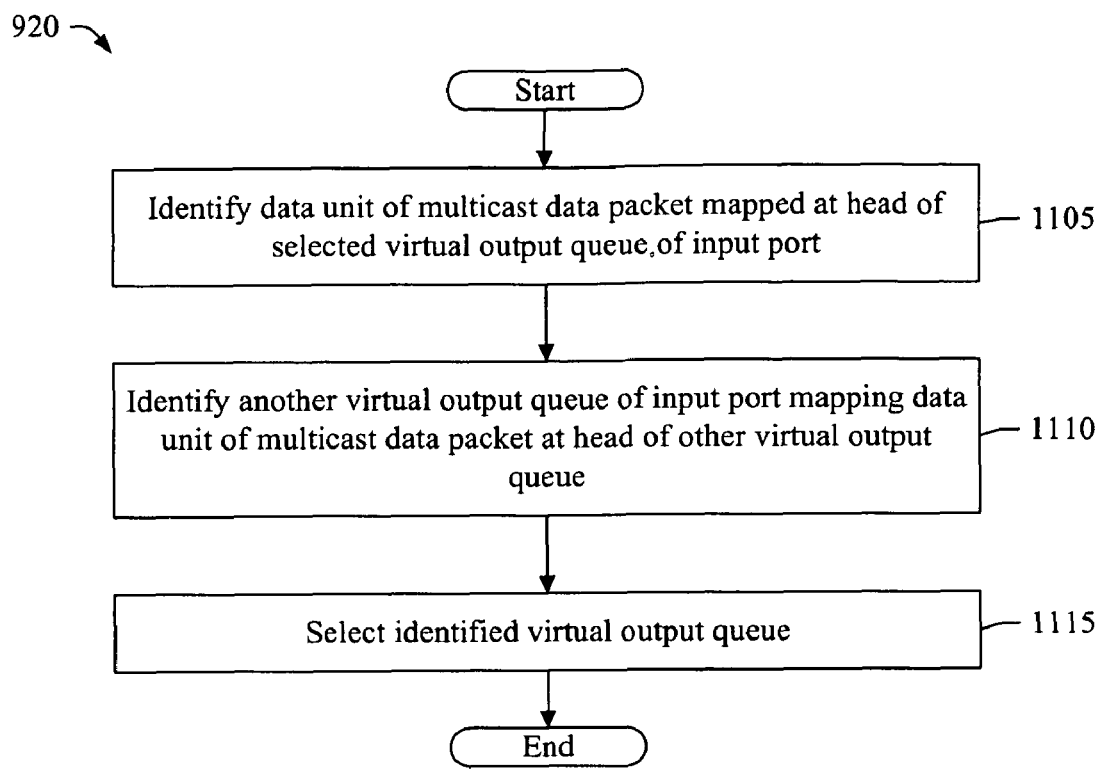
FIG. 11 is a flow chart of a portion of a method of routing data packets through a packet switch by using virtual output queues in the packet switch.

FIG. 11 illustrates a portion of the method 900 for routing data packets through a packet switch 105 by using virtual output queues 300 in the packet switch 105, in accordance with an embodiment of the present invention. The portion of the method 900 illustrated in FIG. 11 is performed in step 920 of the method 900 illustrated in FIG. 9.

In step 1105, a data unit of a multicast data packet mapped at the head of a selected virtual output queue is identified. In various embodiments, the packet switch 105 identifies a data unit 205 of a multicast data packet 200 mapped at the head 405 of a selected virtual output queue 300 (e.g., a first virtual output queue 300) of the input port 125 in the arbitration cycle. In some embodiments, the arbiter 130 identifies the data unit 205 of the multicast data packet 200 mapped at the head 405 of the selected virtual output queue 300. In other embodiments, the packet engine 315 of the input port 125 including the selected virtual output queue 300 identifies the data unit 205 of the multicast data packet 200 mapped at the head 405 of the selected virtual output queue 300. The portion of the method 900 then proceeds to step 1110.

In step 1110, another virtual output queue in the input port mapping the data unit of the multicast data packet at the head of this other virtual output queue is identified. In various embodiments, the packet switch 105 identifies another virtual output queue 300 (e.g., a second virtual output queue 300) in the input port 125 mapping the data unit 205 of the multicast data packet 200 at the head 405 of the identified virtual output queue 300. In some embodiments, the arbiter 130 identifies this other virtual output queue 300. In other embodiments, the packet engine 315 of the input port 125 identifies this other virtual output queue 300. The portion of the method 900 then proceeds to step 1115.

In step 1115, the identified virtual output queue is selected. In various embodiments, the arbiter 130 of the packet switch 105 selects the identified virtual output queue 300 in the arbitration cycle. Thus, the arbiter 130 selects the identified virtual output queue 300 (e.g., the second virtual output queue 300) in the input port 125 in addition to the virtual output queue 300 in the input port 125 already selected by the arbiter 130 in the arbitration cycle (e.g., the first virtual output queue 300). Moreover, each of these selected virtual output queues 300 (e.g., the first virtual output queue 300 and the second virtual output queue 300) maps the same data unit 205 of the multicast data packet 200 at the head 405 of the virtual output queue 300. In various embodiments, the arbiter 130 determines whether the output port 140 corresponding to the identified virtual output queue 300 (e.g., the second virtual output queue 300) is available to accept the data unit 205 at the head 405 of the identified virtual output queue 300 in the arbitration cycle before selecting the identified virtual output queue 300 in the arbitration cycle. This portion of the method 900 then ends.

In various embodiments, the portion of the method 900 illustrated in FIG. 11 may include more or fewer steps than the steps 1105-1115 described above and illustrated in FIG. 11. In some embodiments, one or more of the steps 1105-1115 of the method 900 may be performed in parallel or substantially simultaneously. In various embodiments, the steps 1105-1115 of the method 900 may be performed in a different order than the order described above and illustrated in FIG. 11.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A packet switch, comprising:
   a plurality of output ports, each output port of the plurality of output ports configured to output data units of a data packet received by the output port;
   a plurality of input ports, each input port of the plurality of input ports comprising a plurality of virtual outputs queues corresponding to the plurality of output ports for mapping data units of data packets received by the input port to the plurality of output ports, each input port of the plurality of input ports configured to set an old age indicator for each of the virtual output queues in the plurality of virtual output queues of the input port to indicate the virtual output queue is old if an age of a data unit mapped by the virtual output queue has reached an old age threshold;
   an arbiter coupled to the plurality of input ports and configured to select virtual output queues based on the old age indicators of the virtual output queues and the availability of the output ports corresponding to the selected virtual output queues for storing a data unit, each output port corresponding to a selected virtual output queue being available to store a data unit from the selected virtual output queue; and
   a switch fabric coupled to the plurality of input ports and the plurality of output ports and configured to contemporaneously route data units mapped at heads of the selected virtual output queues to the output ports corresponding to the selected virtual output queues; and
   wherein, an input port of the plurality of input ports includes a counter configured to indicate the age of a virtual output queue in the input port by counting a number of arbitration cycles in which the virtual output queue is not empty and in which the arbiter does not select the virtual output queue.

2. The packet switch of claim 1, wherein an input port of the plurality of input ports is configured to reset the old age indicator of a virtual output queue in the input port to indicate the virtual output queue is young when the virtual output queue no longer maps any data unit of any data packet.

3. The packet switch of claim 1, wherein the arbiter is further configured to select the virtual output queues in the plurality of input ports by selecting at least one old virtual output queue by using a first scheduling algorithm and then selecting at least one young virtual output queue by using a second scheduling algorithm.

4. The packet switch of claim 3, wherein the arbiter is further configured to maximize the number of old virtual output queues in the selected virtual output queues by giving preference to selecting old virtual output queues over young virtual output queues.

5. The packet switch of claim 1, wherein the arbiter is further configured to identify a data unit of a multicast data packet mapped at a head of a selected virtual output queue of an input port, identify another virtual output queue of the input port mapping the data unit of the multicast data packet but the data unit of the multicast data packet is not presently routable from the identified virtual output queue, and modify the old age indicator of the identified virtual output queue to indicate the identified virtual output queue is old.

6. The packet switch of claim 1, wherein the arbiter is further configured to identify a data unit of a multicast data packet mapped at a head of a selected virtual output queue of an input port, identify another virtual output queue of the input port mapping the data unit of the multicast data packet at the head of the identified virtual output queue, and select the identified virtual output queue as one of the selected virtual output queues.

7. A method comprising:
   receiving a plurality of data units of data packets at a plurality of input ports of a packet switch, each input port comprising a plurality of virtual output queues corresponding to a plurality of output ports of the packet switch;
   mapping each data unit of the plurality of data units to an output port of the packet switch by using a virtual output queue of the input port receiving the data unit;
   maintaining a counter to indicate the age of a virtual output queue in an input port by counting a number of arbitration cycles in which the virtual output queue is not empty and is not selected;
   setting an old age indicator for each of the virtual output queues in the plurality of input ports to indicate the virtual output queue is old if an age of a data unit mapped by the virtual output queue has reached an old age threshold;
   selecting virtual output queues based on the old age indicators so that data units mapped at the heads of the selected virtual output queues are capable of being routed contemporaneously through a switch fabric of the packet switch and stored in the output ports corresponding to the selected virtual output queues; and
   routing the data units mapped at the heads of the selected virtual output queues to the output ports corresponding to the selected virtual output queues contemporaneously.

8. The method of claim 7, further comprising:
   resetting the old age indicator of a virtual output queue to indicate the virtual output queue is young when the virtual output queue no longer maps any data unit of any data packet.

9. The method of claim 7, wherein selecting the virtual output queues comprises selecting at least one old virtual output queue by using a first scheduling algorithm and then selecting at least one young virtual output queue by using a second scheduling algorithm.

10. The method of claim 9, wherein selecting the virtual output queues further comprises maximizing the number of old virtual output queues in the selected virtual output queues by giving preference to selecting old virtual output queues over young virtual output queues.

11. The method of claim 7, wherein selecting the virtual output queues comprises:
   identifying a data unit of a multicast data packet mapped at a head of a selected virtual output queue of an input port;
   identifying another virtual output queue of the input port mapping the data unit of the multicast data packet but the data unit of the multicast data packet is not presently routable from the identified virtual output queue; and
   modifying the old age indicator of the identified virtual output queue to indicate the identified virtual output queue is old.

12. The method of claim 7, wherein selecting the virtual output queues comprises:
   identifying a data unit of a multicast data packet mapped at a head of a selected virtual output queue of an input port;
   identifying another virtual output queue of the input port mapping the data unit of the multicast data packet; and
   selecting the identified virtual output queue as one of the selected virtual output queues.

* * * * *